(12) United States Patent
Powell et al.

(10) Patent No.: US 10,918,905 B2
(45) Date of Patent: Feb. 16, 2021

(54) SYSTEMS AND METHODS FOR REDUCING RUNAWAY RESISTANCE ON AN EXERCISE DEVICE

(71) Applicant: ICON Health & Fitness, Inc., Logan, UT (US)

(72) Inventors: Wade A. Powell, Millville, UT (US); Dale Alan Buchanan, Nibley, UT (US)

(73) Assignee: ICON Health & Fitness, Inc., Logan, UT (US)

( * ) Notice: Subject to any disclaimer, the term of this patent is extended or adjusted under 35 U.S.C. 154(b) by 34 days.

(21) Appl. No.: 16/508,827

(22) Filed: Jul. 11, 2019

(65) Prior Publication Data

US 2019/0329091 A1  Oct. 31, 2019

Related U.S. Application Data

(63) Continuation of application No. 15/847,279, filed on Dec. 19, 2017, now Pat. No. 10,376,736, which is a
(Continued)

(51) Int. Cl.
*A63B 22/02* (2006.01)
*H02K 7/10* (2006.01)
(Continued)

(52) U.S. Cl.
CPC ...... *A63B 22/0235* (2013.01); *A63B 22/0023* (2013.01); *F04D 25/082* (2013.01);
(Continued)

(58) Field of Classification Search
CPC ... A63B 21/05; A63B 21/032; A63B 21/4033; A63B 23/03516; A63B 23/0355;
(Continued)

(56) References Cited

U.S. PATENT DOCUMENTS

| | | |
|---|---|---|
| 683,284 A | 9/1901 | Honey |
| 2,743,623 A | 5/1956 | Wells |

(Continued)

FOREIGN PATENT DOCUMENTS

| | | |
|---|---|---|
| CN | 100354017 | 12/2007 |
| KR | 100624647 | 10/2006 |

(Continued)

OTHER PUBLICATIONS

U.S. Appl. No. 29/568,648, filed Jun. 20, 2016, ICON Health & Fitness, Inc.
(Continued)

*Primary Examiner* — Garrett K Atkinson
(74) *Attorney, Agent, or Firm* — Ray Quinney & Nebeker

(57) ABSTRACT

A treadmill may include a deck, a first pulley incorporated into the deck, a second pulley incorporated into the deck, a tread belt surrounding the first pulley and the second pulley, a motor in mechanical communication with at least one of the first pulley and the second pulley to move the tread belt in a first direction, and a runaway mitigation mechanism in at least indirect mechanical communication with the motor. The runaway mitigation mechanism at least mitigates a motor runaway condition.

20 Claims, 9 Drawing Sheets

Related U.S. Application Data continuation-in-part of application No. 15/730,516, filed on Oct. 11, 2017, now Pat. No. 10,207,148.

(60) Provisional application No. 62/407,073, filed on Oct. 12, 2016.

(51) Int. Cl.
    *A63B 22/00*     (2006.01)
    *F04D 25/08*     (2006.01)
    *H02K 9/06*     (2006.01)
    *A63B 71/06*     (2006.01)
    *A63B 21/015*     (2006.01)
    *A63B 21/008*     (2006.01)
    *A63B 21/005*     (2006.01)

(52) U.S. Cl.
    CPC ............. *H02K 7/1008* (2013.01); *H02K 9/06* (2013.01); *A63B 21/0051* (2013.01); *A63B 21/0053* (2013.01); *A63B 21/0084* (2013.01); *A63B 21/0088* (2013.01); *A63B 21/015* (2013.01); *A63B 71/0622* (2013.01); *A63B 2071/063* (2013.01); *A63B 2220/16* (2013.01); *A63B 2220/18* (2013.01); *A63B 2220/30* (2013.01); *A63B 2220/40* (2013.01); *A63B 2220/72* (2013.01); *A63B 2220/76* (2013.01); *A63B 2225/09* (2013.01); *A63B 2225/20* (2013.01); *A63B 2225/50* (2013.01); *A63B 2243/002* (2013.01)

(58) Field of Classification Search
CPC ... A63B 23/025; A63B 23/1281; A63B 23/02; A63B 2208/0204; A63B 2023/0411; A63B 2208/0233; A63B 2210/52; A63B 21/4035; A63B 2210/50; A63B 2225/10; A63B 2209/00; A63B 2210/58; A63B 2071/0063
See application file for complete search history.

(56) References Cited

U.S. PATENT DOCUMENTS

| | | |
|---|---|---|
| 3,123,646 A | 3/1964 | Easton |
| 3,368,746 A | 2/1968 | Zelinski |
| 3,408,067 A * | 10/1968 | Armstrong .............. A63B 22/02 482/30 |
| 3,579,339 A | 5/1971 | Chang et al. |
| 3,711,812 A * | 1/1973 | Cherry .................. A63B 22/02 338/200 |
| 4,023,795 A | 5/1977 | Pauls |
| 4,082,267 A | 4/1978 | Flavell |
| 4,204,673 A * | 5/1980 | Speer, Sr. .......... A63B 22/0012 198/817 |
| 4,300,760 A | 11/1981 | Bobroff |
| 4,334,695 A | 6/1982 | Ashby |
| 4,423,864 A * | 1/1984 | Wiik .................. A63B 22/0012 434/253 |
| D286,311 S | 10/1986 | Martinell et al. |
| 4,681,318 A | 7/1987 | Lay |
| 4,684,126 A | 8/1987 | Dalebout et al. |
| 4,728,102 A | 3/1988 | Pauls |
| 4,733,858 A * | 3/1988 | Lan .................... A63B 23/1209 482/113 |
| 4,749,181 A * | 6/1988 | Pittaway ................ A63B 22/02 482/54 |
| 4,750,736 A | 6/1988 | Watterson |
| 4,788,493 A | 11/1988 | Liptak |
| 4,796,881 A | 1/1989 | Watterson |
| 4,813,667 A | 3/1989 | Watterson |
| 4,830,371 A | 5/1989 | Lay |
| 4,844,451 A | 7/1989 | Bersonnet et al. |
| 4,850,585 A | 7/1989 | Dalebout |
| D304,849 S | 11/1989 | Watterson |
| 4,880,225 A | 11/1989 | Lucas et al. |
| 4,883,272 A | 11/1989 | Lay |
| D306,468 S | 3/1990 | Watterson |
| D306,891 S | 3/1990 | Watterson |
| 4,913,396 A | 4/1990 | Dalebout et al. |
| D307,614 S | 5/1990 | Bingham et al. |
| D307,615 S | 5/1990 | Bingham et al. |
| 4,921,242 A | 5/1990 | Watterson |
| 4,932,650 A | 6/1990 | Bingham et al. |
| D309,167 S | 7/1990 | Griffin |
| D309,485 S | 7/1990 | Bingham et al. |
| 4,938,478 A | 7/1990 | Lay |
| D310,253 S | 8/1990 | Bersonnet et al. |
| 4,955,599 A | 9/1990 | Bersonnet et al. |
| 4,971,316 A | 11/1990 | Dalebout et al. |
| D313,055 S | 12/1990 | Watterson |
| 4,974,832 A | 12/1990 | Dalebout |
| 4,979,737 A | 12/1990 | Kock |
| 4,981,294 A | 1/1991 | Dalebout et al. |
| D315,765 S | 3/1991 | Measom et al. |
| 4,998,725 A | 3/1991 | Watterson et al. |
| 5,000,442 A | 3/1991 | Dalebout et al. |
| 5,000,443 A | 3/1991 | Dalebout et al. |
| 5,000,444 A | 3/1991 | Dalebout et al. |
| D316,124 S | 4/1991 | Dalebout et al. |
| 5,013,033 A | 5/1991 | Watterson et al. |
| 5,014,980 A | 5/1991 | Bersonnet et al. |
| 5,016,871 A | 5/1991 | Dalebout et al. |
| D318,085 S | 7/1991 | Jacobson et al. |
| D318,086 S | 7/1991 | Bingham et al. |
| D318,699 S | 7/1991 | Jacobson et al. |
| 5,029,801 A | 7/1991 | Dalebout et al. |
| 5,034,576 A | 7/1991 | Dalebout et al. |
| 5,058,881 A | 10/1991 | Measom |
| 5,058,882 A | 10/1991 | Dalebout et al. |
| D321,388 S | 11/1991 | Dalebout |
| 5,062,626 A | 11/1991 | Dalebout et al. |
| 5,062,627 A | 11/1991 | Bingham |
| 5,062,632 A | 11/1991 | Dalebout et al. |
| 5,062,633 A | 11/1991 | Engel et al. |
| 5,067,710 A | 11/1991 | Watterson et al. |
| 5,072,929 A | 12/1991 | Peterson et al. |
| D323,009 S | 1/1992 | Dalebout et al. |
| D323,198 S | 1/1992 | Dalebout et al. |
| D323,199 S | 1/1992 | Dalebout et al. |
| D323,863 S | 2/1992 | Watterson |
| 5,088,729 A | 2/1992 | Dalebout |
| 5,090,694 A | 2/1992 | Pauls et al. |
| 5,102,380 A | 4/1992 | Jacobson et al. |
| 5,104,120 A | 4/1992 | Watterson et al. |
| 5,108,093 A | 4/1992 | Watterson |
| D326,491 S | 5/1992 | Dalebout |
| 5,122,105 A | 6/1992 | Engel et al. |
| 5,135,216 A | 8/1992 | Bingham et al. |
| 5,147,265 A | 9/1992 | Pauls et al. |
| 5,149,084 A | 9/1992 | Dalebout et al. |
| 5,149,312 A | 9/1992 | Croft et al. |
| 5,171,196 A | 12/1992 | Lynch |
| D332,347 S | 1/1993 | Raadt et al. |
| 5,190,505 A | 3/1993 | Dalebout et al. |
| 5,192,255 A | 3/1993 | Dalebout et al. |
| 5,195,937 A | 3/1993 | Engel et al. |
| 5,203,826 A | 4/1993 | Dalebout |
| D335,511 S | 5/1993 | Engel et al. |
| D335,905 S | 5/1993 | Cutter et al. |
| D336,498 S | 6/1993 | Engel et al. |
| 5,217,487 A | 6/1993 | Engel et al. |
| D337,361 S | 7/1993 | Engel et al. |
| D337,666 S | 7/1993 | Peterson et al. |
| D337,799 S | 7/1993 | Cutter et al. |
| 5,226,866 A | 7/1993 | Engel et al. |
| 5,244,446 A | 9/1993 | Engel et al. |
| 5,247,853 A | 9/1993 | Dalebout |
| 5,259,611 A | 11/1993 | Dalebout et al. |
| D342,106 S | 12/1993 | Campbell et al. |
| 5,279,528 A | 1/1994 | Dalebout et al. |
| D344,112 S | 2/1994 | Smith |

(56) References Cited

U.S. PATENT DOCUMENTS

| | | | |
|---|---|---|---|
| D344,557 S | 2/1994 | Ashby | |
| 5,282,776 A | 2/1994 | Dalebout | |
| 5,295,927 A * | 3/1994 | Easley | A63B 21/015 482/51 |
| 5,295,931 A | 3/1994 | Dreibelbis et al. | |
| 5,302,161 A | 4/1994 | Loubert et al. | |
| D347,251 S | 5/1994 | Dreibelbis et al. | |
| 5,314,390 A * | 5/1994 | Westing | A63B 21/00178 482/111 |
| 5,316,534 A | 5/1994 | Dalebout et al. | |
| D348,493 S | 7/1994 | Ashby | |
| D348,494 S | 7/1994 | Ashby | |
| 5,328,164 A | 7/1994 | Soga | |
| 5,330,507 A * | 7/1994 | Schwartz | A61N 1/36114 600/510 |
| D349,931 S | 8/1994 | Bostic et al. | |
| 5,336,142 A | 8/1994 | Dalebout et al. | |
| 5,344,376 A | 9/1994 | Bostic et al. | |
| D351,202 S | 10/1994 | Bingham | |
| D351,435 S | 10/1994 | Peterson et al. | |
| D351,633 S | 10/1994 | Bingham | |
| D352,534 S | 11/1994 | Dreibelbis et al. | |
| D353,422 S | 12/1994 | Bostic et al. | |
| 5,372,559 A | 12/1994 | Dalebout et al. | |
| 5,374,228 A | 12/1994 | Buisman et al. | |
| 5,382,207 A | 1/1995 | Skowronski et al. | |
| 5,382,221 A | 1/1995 | Hsu et al. | |
| 5,387,168 A | 2/1995 | Bostic | |
| 5,393,690 A | 2/1995 | Fu et al. | |
| D356,128 S | 3/1995 | Smith et al. | |
| 5,409,435 A | 4/1995 | Daniels | |
| 5,429,563 A | 7/1995 | Engel et al. | |
| 5,431,612 A | 7/1995 | Holden | |
| D360,915 S | 8/1995 | Bostic et al. | |
| 5,468,205 A | 11/1995 | McFall et al. | |
| 5,489,249 A | 2/1996 | Brewer et al. | |
| 5,492,517 A | 2/1996 | Bostic et al. | |
| D367,689 S | 3/1996 | Wilkinson et al. | |
| 5,511,740 A | 4/1996 | Loubert et al. | |
| 5,512,025 A | 4/1996 | Dalebout et al. | |
| D370,949 S | 6/1996 | Furner | |
| D371,176 S | 6/1996 | Furner | |
| 5,527,245 A | 6/1996 | Dalebout | |
| 5,529,553 A | 6/1996 | Finlayson | |
| 5,540,429 A | 7/1996 | Dalebout et al. | |
| 5,549,533 A | 8/1996 | Olson et al. | |
| 5,554,085 A | 9/1996 | Dalebout | |
| 5,569,128 A | 10/1996 | Dalebout | |
| 5,591,105 A | 1/1997 | Dalebout et al. | |
| 5,591,106 A | 1/1997 | Dalebout et al. | |
| 5,595,556 A | 1/1997 | Dalebout et al. | |
| 5,607,375 A | 3/1997 | Dalebout | |
| 5,611,539 A | 3/1997 | Watterson | |
| 5,622,527 A | 4/1997 | Watterson et al. | |
| 5,626,538 A | 5/1997 | Dalebout et al. | |
| 5,626,542 A | 5/1997 | Dalebout et al. | |
| D380,024 S | 6/1997 | Novak et al. | |
| 5,637,059 A | 6/1997 | Dalebout | |
| D380,509 S | 7/1997 | Wilkinson et al. | |
| 5,643,153 A | 7/1997 | Nylen et al. | |
| 5,645,509 A | 7/1997 | Brewer et al. | |
| D384,118 S | 9/1997 | Deblauw | |
| 5,662,557 A | 9/1997 | Watterson et al. | |
| 5,669,857 A | 9/1997 | Watterson et al. | |
| 5,672,140 A | 9/1997 | Watterson et al. | |
| 5,674,156 A | 10/1997 | Watterson et al. | |
| 5,674,453 A | 10/1997 | Watterson et al. | |
| 5,676,624 A | 10/1997 | Watterson et al. | |
| 5,683,331 A | 11/1997 | Dalebout | |
| 5,683,332 A | 11/1997 | Watterson et al. | |
| D387,825 S | 12/1997 | Fleck et al. | |
| 5,695,433 A | 12/1997 | Buisman | |
| 5,695,434 A | 12/1997 | Dalebout et al. | |
| 5,695,435 A | 12/1997 | Dalebout et al. | |
| 5,702,325 A | 12/1997 | Watterson et al. | |
| 5,704,879 A | 1/1998 | Watterson et al. | |
| 5,718,657 A | 2/1998 | Dalebout et al. | |
| 5,720,200 A | 2/1998 | Anderson et al. | |
| 5,720,698 A | 2/1998 | Dalebout et al. | |
| D392,006 S | 3/1998 | Dalebout et al. | |
| 5,722,922 A | 3/1998 | Watterson et al. | |
| 5,733,229 A | 3/1998 | Dalebout et al. | |
| 5,738,611 A * | 4/1998 | Ehrenfried | A63B 21/023 482/129 |
| 5,743,833 A | 4/1998 | Watterson et al. | |
| 5,762,584 A | 6/1998 | Daniels | |
| 5,762,587 A | 6/1998 | Dalebout et al. | |
| 5,772,560 A | 6/1998 | Watterson et al. | |
| 5,810,698 A | 9/1998 | Hullett et al. | |
| 5,827,155 A | 10/1998 | Jensen | |
| 5,830,114 A | 11/1998 | Halfen et al. | |
| 5,830,162 A * | 11/1998 | Giovannetti | A61B 5/1038 601/23 |
| 5,860,893 A | 1/1999 | Watterson et al. | |
| 5,860,894 A | 1/1999 | Dalebout et al. | |
| 5,879,273 A | 3/1999 | Wei | |
| 5,899,834 A | 5/1999 | Dalebout et al. | |
| D412,953 S | 8/1999 | Armstrong | |
| D413,948 S | 9/1999 | Dalebout | |
| 5,951,441 A | 9/1999 | Dalebout | |
| 5,951,448 A | 9/1999 | Bolland | |
| D416,596 S | 11/1999 | Armstrong | |
| 6,003,166 A | 12/1999 | Hald et al. | |
| 6,019,710 A | 2/2000 | Dalebout et al. | |
| 6,027,429 A | 2/2000 | Daniels | |
| 6,033,347 A | 3/2000 | Dalebout et al. | |
| 6,042,513 A * | 3/2000 | Koteles | A63B 24/00 318/1 |
| 6,045,490 A | 4/2000 | Shafer et al. | |
| D425,940 S | 5/2000 | Halfen et al. | |
| 6,059,692 A | 5/2000 | Hickman | |
| 6,066,163 A * | 5/2000 | John | A61N 1/36135 607/45 |
| D428,949 S | 8/2000 | Simonson | |
| 6,095,952 A * | 8/2000 | Ali | A63B 22/02 482/35 |
| 6,123,646 A | 9/2000 | Colassi | |
| 6,132,724 A * | 10/2000 | Blum | A61K 33/24 424/725 |
| 6,160,955 A * | 12/2000 | Bicciato | A63B 22/02 318/434 |
| 6,171,217 B1 | 1/2001 | Cutler | |
| 6,171,219 B1 | 1/2001 | Simonson | |
| 6,174,267 B1 | 1/2001 | Dalebout | |
| 6,193,631 B1 | 2/2001 | Hickman | |
| 6,228,003 B1 | 5/2001 | Hald et al. | |
| 6,238,323 B1 | 5/2001 | Simonson | |
| 6,251,052 B1 | 6/2001 | Simonson | |
| 6,261,022 B1 | 7/2001 | Dalebout et al. | |
| 6,280,362 B1 | 8/2001 | Dalebout et al. | |
| 6,296,594 B1 | 10/2001 | Simonson | |
| D450,872 S | 11/2001 | Dalebout et al. | |
| 6,312,363 B1 | 11/2001 | Watterson et al. | |
| D452,338 S | 12/2001 | Dalebout et al. | |
| D453,543 S | 2/2002 | Cutler | |
| D453,948 S | 2/2002 | Cutler | |
| 6,350,218 B1 | 2/2002 | Dalebout et al. | |
| 6,387,020 B1 | 5/2002 | Simonson | |
| 6,413,191 B1 | 7/2002 | Harris et al. | |
| 6,422,980 B1 | 7/2002 | Simonson | |
| 6,447,424 B1 | 9/2002 | Ashby et al. | |
| 6,458,060 B1 | 10/2002 | Watterson et al. | |
| 6,458,061 B2 | 10/2002 | Simonson | |
| 6,463,328 B1 * | 10/2002 | John | A61N 1/36135 607/45 |
| 6,471,622 B1 | 10/2002 | Hammer et al. | |
| 6,485,397 B1 | 11/2002 | Manderbacka | |
| 6,563,225 B2 | 5/2003 | Soga et al. | |
| 6,601,016 B1 | 7/2003 | Brown et al. | |
| 6,623,140 B2 | 9/2003 | Watterson | |
| 6,626,799 B2 | 9/2003 | Watterson et al. | |
| 6,652,424 B2 | 11/2003 | Dalebout | |

(56) References Cited

U.S. PATENT DOCUMENTS

| | | |
|---|---|---|
| 6,676,569 B1 * | 1/2004 | Radow .............. A63B 22/0235 482/4 |
| 6,685,607 B1 | 2/2004 | Olson |
| 6,695,581 B2 | 2/2004 | Wasson et al. |
| 6,701,271 B2 | 3/2004 | Willner et al. |
| 6,702,719 B1 | 3/2004 | Brown et al. |
| 6,712,740 B2 | 3/2004 | Simonson |
| 6,730,002 B2 | 5/2004 | Hald et al. |
| 6,743,153 B2 | 6/2004 | Watterson et al. |
| 6,746,371 B1 | 6/2004 | Brown et al. |
| 6,749,537 B1 | 6/2004 | Hickman |
| 6,761,667 B1 | 7/2004 | Cutler et al. |
| 6,770,015 B2 | 8/2004 | Simonson |
| 6,786,852 B2 | 9/2004 | Watterson et al. |
| 6,808,472 B1 | 10/2004 | Hickman |
| 6,821,230 B2 | 11/2004 | Dalebout et al. |
| 6,830,540 B2 | 12/2004 | Watterson |
| 6,863,641 B1 | 3/2005 | Brown et al. |
| 6,866,613 B1 | 3/2005 | Brown et al. |
| 6,875,160 B2 | 4/2005 | Watterson et al. |
| 6,880,487 B2 * | 4/2005 | Reinkensmeyer ... A01K 15/027 119/421 |
| D507,311 S | 7/2005 | Butler et al. |
| 6,918,858 B2 | 7/2005 | Watterson et al. |
| 6,921,351 B1 | 7/2005 | Hickman et al. |
| 6,974,404 B1 | 12/2005 | Watterson et al. |
| 6,997,852 B2 | 2/2006 | Watterson et al. |
| 7,025,713 B2 | 4/2006 | Dalebout |
| D520,085 S | 5/2006 | Willardson et al. |
| 7,044,897 B2 | 5/2006 | Myers et al. |
| 7,052,442 B2 | 5/2006 | Watterson |
| 7,060,006 B1 | 6/2006 | Watterson et al. |
| 7,060,008 B2 | 6/2006 | Watterson et al. |
| 7,070,539 B2 | 7/2006 | Brown et al. |
| 7,097,588 B2 | 8/2006 | Watterson |
| D527,776 S | 9/2006 | Willardson et al. |
| 7,112,168 B2 | 9/2006 | Dalebout et al. |
| 7,125,388 B1 * | 10/2006 | Reinkensmeyer .......................... A63B 69/0064 601/5 |
| 7,128,693 B2 | 10/2006 | Brown et al. |
| 7,166,062 B1 | 1/2007 | Watterson et al. |
| 7,166,064 B2 | 1/2007 | Watterson et al. |
| 7,169,087 B2 | 1/2007 | Ercanbrack et al. |
| 7,169,093 B2 | 1/2007 | Simonson et al. |
| 7,192,388 B2 | 3/2007 | Dalebout et al. |
| 7,250,022 B2 | 7/2007 | Dalebout |
| 7,282,016 B2 | 10/2007 | Simonson |
| 7,285,075 B2 | 10/2007 | Cutler et al. |
| 7,344,481 B2 | 3/2008 | Watterson et al. |
| 7,377,882 B2 | 5/2008 | Watterson |
| 7,381,163 B2 * | 6/2008 | Gordon .............. A63B 22/02 482/69 |
| 7,425,188 B2 | 9/2008 | Ercanbrack |
| 7,429,236 B2 | 9/2008 | Dalebout et al. |
| 7,455,622 B2 | 11/2008 | Watterson et al. |
| 7,482,050 B2 | 1/2009 | Olson |
| D588,655 S | 3/2009 | Utykanski |
| 7,510,509 B2 | 3/2009 | Hickman |
| 7,537,546 B2 | 5/2009 | Watterson et al. |
| 7,537,549 B2 | 5/2009 | Nelson et al. |
| 7,537,552 B2 | 5/2009 | Dalebout et al. |
| 7,540,828 B2 | 6/2009 | Watterson et al. |
| 7,549,947 B2 | 6/2009 | Hickman et al. |
| 7,556,590 B2 | 7/2009 | Watterson et al. |
| 7,563,203 B2 | 7/2009 | Dalebout et al. |
| 7,575,536 B1 | 8/2009 | Hickman |
| 7,601,105 B1 | 10/2009 | Gipson, III et al. |
| 7,604,573 B2 | 10/2009 | Dalebout et al. |
| D604,373 S | 11/2009 | Dalebout et al. |
| 7,618,350 B2 | 11/2009 | Dalebout et al. |
| 7,618,357 B2 | 11/2009 | Dalebout |
| 7,621,850 B2 * | 11/2009 | Piaget ................ A63B 22/0056 482/54 |
| 7,625,315 B2 | 12/2009 | Hickman |
| 7,625,321 B2 | 12/2009 | Simonson et al. |
| 7,628,730 B1 | 12/2009 | Watterson et al. |
| 7,628,737 B2 | 12/2009 | Kowallis et al. |
| 7,637,847 B1 | 12/2009 | Hickman |
| 7,645,212 B2 | 1/2010 | Ashby et al. |
| 7,645,213 B2 | 1/2010 | Watterson |
| 7,658,698 B2 | 2/2010 | Pacheco et al. |
| 7,674,205 B2 | 3/2010 | Dalebout et al. |
| 7,713,171 B1 | 5/2010 | Hickman |
| 7,713,172 B2 | 5/2010 | Watterson et al. |
| 7,713,180 B2 | 5/2010 | Wickens |
| 7,717,828 B2 | 5/2010 | Simonson et al. |
| 7,736,279 B2 | 6/2010 | Dalebout et al. |
| 7,740,563 B2 | 6/2010 | Dalebout et al. |
| 7,749,144 B2 | 7/2010 | Hammer |
| 7,766,797 B2 | 8/2010 | Dalebout |
| 7,771,329 B2 | 8/2010 | Dalebout et al. |
| 7,775,940 B2 | 8/2010 | Dalebout et al. |
| 7,789,800 B1 | 9/2010 | Watterson et al. |
| 7,798,946 B2 | 9/2010 | Dalebout et al. |
| 7,815,550 B2 | 10/2010 | Watterson et al. |
| 7,857,731 B2 | 12/2010 | Hickman et al. |
| 7,862,475 B2 | 1/2011 | Watterson |
| 7,862,478 B2 | 1/2011 | Watterson et al. |
| 7,862,483 B2 | 1/2011 | Hendrickson et al. |
| D635,207 S | 3/2011 | Dalebout et al. |
| 7,901,330 B2 | 3/2011 | Dalebout et al. |
| 7,909,740 B2 | 3/2011 | Dalebout et al. |
| 7,980,996 B2 | 7/2011 | Hickman |
| 7,981,000 B2 | 7/2011 | Watterson et al. |
| 7,985,164 B2 | 7/2011 | Ashby |
| 8,002,674 B2 * | 8/2011 | Piaget ................ A63B 22/0056 482/52 |
| 8,011,242 B2 | 9/2011 | O'neill |
| 8,029,415 B2 | 10/2011 | Ashby et al. |
| 8,033,960 B1 | 10/2011 | Dalebout et al. |
| D650,451 S | 12/2011 | Olson et al. |
| D652,877 S | 1/2012 | Dalebout et al. |
| 8,152,702 B2 | 4/2012 | Pacheco |
| D659,775 S | 5/2012 | Olson et al. |
| D659,777 S | 5/2012 | Watterson et al. |
| D660,383 S | 5/2012 | Watterson et al. |
| D664,613 S | 7/2012 | Dalebout et al. |
| 8,251,874 B2 | 8/2012 | Ashby et al. |
| 8,298,123 B2 | 10/2012 | Hickman |
| 8,298,125 B2 | 10/2012 | Colledge et al. |
| D671,177 S | 11/2012 | Sip |
| D671,178 S | 11/2012 | Sip |
| D673,626 S | 1/2013 | Olson et al. |
| 8,550,962 B2 * | 10/2013 | Piaget ................ A63B 23/0429 482/52 |
| 8,690,735 B2 | 4/2014 | Watterson et al. |
| D707,763 S | 6/2014 | Cutler |
| 8,740,753 B2 | 6/2014 | Olson et al. |
| 8,758,201 B2 | 6/2014 | Ashby et al. |
| 8,771,153 B2 | 7/2014 | Dalebout et al. |
| 8,784,270 B2 | 7/2014 | Watterson |
| 8,808,148 B2 | 8/2014 | Watterson |
| 8,814,762 B2 | 8/2014 | Butler |
| D712,493 S | 9/2014 | Ercanbrack et al. |
| 8,840,075 B2 | 9/2014 | Olson |
| 8,845,493 B2 | 9/2014 | Watterson et al. |
| 8,870,726 B2 | 10/2014 | Watterson et al. |
| 8,876,668 B2 | 11/2014 | Hendrickson et al. |
| 8,894,549 B2 | 11/2014 | Colledge |
| 8,894,555 B2 | 11/2014 | Olson |
| 8,911,330 B2 | 12/2014 | Watterson et al. |
| 8,920,288 B2 | 12/2014 | Dalebout |
| 8,968,160 B2 | 3/2015 | Cassano |
| 8,986,165 B2 | 3/2015 | Ashby |
| 8,992,364 B2 | 3/2015 | Law et al. |
| 8,992,387 B2 | 3/2015 | Watterson et al. |
| D726,476 S | 4/2015 | Ercanbrack |
| 9,028,368 B2 | 5/2015 | Ashby et al. |
| 9,028,370 B2 | 5/2015 | Watterson |
| 9,039,578 B2 | 5/2015 | Dalebout |
| D731,011 S | 6/2015 | Buchanan |
| 9,072,930 B2 | 7/2015 | Ashby et al. |

(56) References Cited

U.S. PATENT DOCUMENTS

| | | |
|---|---|---|
| 9,119,983 B2 | 9/2015 | Rhea |
| 9,123,317 B2 | 9/2015 | Watterson et al. |
| 9,126,071 B2 | 9/2015 | Smith |
| 9,126,072 B2 | 9/2015 | Watterson |
| 9,138,615 B2 | 9/2015 | Olson et al. |
| 9,142,139 B2 | 9/2015 | Watterson et al. |
| 9,144,703 B2 | 9/2015 | Dalebout et al. |
| 9,149,683 B2 | 9/2015 | Smith |
| 9,186,535 B2 | 11/2015 | Ercanbrack |
| 9,186,549 B2 | 11/2015 | Watterson et al. |
| 9,254,409 B2 | 2/2016 | Dalebout et al. |
| 9,254,416 B2 | 2/2016 | Ashby |
| 9,278,248 B2 | 3/2016 | Tyger |
| 9,278,249 B2 | 3/2016 | Watterson |
| 9,278,250 B2 | 3/2016 | Buchanan |
| 9,289,648 B2 | 3/2016 | Watterson |
| 9,339,691 B2 | 5/2016 | Brammer |
| 9,352,185 B2 | 5/2016 | Hendrickson et al. |
| 9,352,186 B2 | 5/2016 | Watterson |
| 9,375,605 B2 | 6/2016 | Tyger |
| 9,381,394 B2 | 7/2016 | Mortensen et al. |
| 9,387,387 B2 | 7/2016 | Dalebout |
| 9,393,453 B2 | 7/2016 | Watterson |
| 9,403,047 B2 | 8/2016 | Olson |
| 9,403,051 B2 | 8/2016 | Cutler |
| 9,421,416 B2 | 8/2016 | Mortensen et al. |
| 9,457,219 B2 | 10/2016 | Smith |
| 9,457,220 B2 | 10/2016 | Olson |
| 9,457,222 B2 | 10/2016 | Dalebout |
| 9,460,632 B2 | 10/2016 | Watterson |
| 9,463,356 B2 | 10/2016 | Rhea |
| 9,468,794 B2 | 10/2016 | Barton |
| 9,468,798 B2 | 10/2016 | Dalebout |
| 9,480,874 B2 | 11/2016 | Cutler |
| 9,492,704 B2 | 11/2016 | Mortensen et al. |
| 9,498,668 B2 | 11/2016 | Smith |
| 9,517,378 B2 | 12/2016 | Ashby et al. |
| 9,521,901 B2 | 12/2016 | Dalebout |
| 9,533,187 B2 | 1/2017 | Dalebout |
| 9,539,461 B2 | 1/2017 | Ercanbrack |
| 9,579,544 B2 | 2/2017 | Watterson |
| 9,586,086 B2 | 3/2017 | Dalebout et al. |
| 9,586,090 B2 | 3/2017 | Watterson et al. |
| 9,604,099 B2 | 3/2017 | Taylor |
| 9,616,276 B2 | 4/2017 | Dalebout |
| 9,616,278 B2 | 4/2017 | Olson |
| 9,623,281 B2 | 4/2017 | Hendrickson |
| 9,636,567 B2 | 5/2017 | Brammer et al. |
| 9,671,316 B2 * | 6/2017 | Hsu .................... G07C 3/00 |
| 9,675,839 B2 | 6/2017 | Dalebout |
| 9,682,307 B2 | 6/2017 | Dalebout |
| 9,694,234 B2 | 7/2017 | Dalebout et al. |
| 9,694,242 B2 | 7/2017 | Ashby |
| 9,737,755 B2 | 8/2017 | Dalebout |
| 9,757,605 B2 | 9/2017 | Olson et al. |
| 9,764,184 B2 | 9/2017 | Kueker |
| 9,764,186 B2 | 9/2017 | Dalebout |
| 9,767,785 B2 | 9/2017 | Ashby |
| 9,795,822 B2 | 10/2017 | Smith et al. |
| 9,808,672 B2 | 11/2017 | Dalebout |
| 9,821,465 B2 * | 11/2017 | Stephens, Jr. ...... A63B 22/0285 |
| 9,849,326 B2 | 12/2017 | Smith |
| 9,878,210 B2 | 1/2018 | Watterson |
| 9,889,334 B2 | 2/2018 | Ashby et al. |
| 9,889,339 B2 | 2/2018 | Douglass |
| 9,937,376 B2 | 4/2018 | McInelly et al. |
| 9,937,377 B2 | 4/2018 | McInelly et al. |
| 9,937,378 B2 | 4/2018 | Dalebout et al. |
| 9,937,379 B2 | 4/2018 | Mortensen |
| 9,943,719 B2 | 4/2018 | Smith et al. |
| 9,943,722 B2 | 4/2018 | Dalebout |
| 9,948,037 B2 | 4/2018 | Ashby |
| 9,968,816 B2 | 5/2018 | Olson et al. |
| 9,968,821 B2 | 5/2018 | Finlayson et al. |
| 9,968,823 B2 | 5/2018 | Cutler |
| 9,975,248 B2 * | 5/2018 | Stephens, Jr. .......... B25J 9/1689 |
| 10,010,755 B2 | 7/2018 | Watterson |
| 10,010,756 B2 | 7/2018 | Watterson |
| 10,029,145 B2 | 7/2018 | Douglass |
| D826,350 S | 8/2018 | Hochstrasser |
| 10,046,196 B2 | 8/2018 | Ercanbrack |
| 10,062,529 B2 * | 8/2018 | Barker .................. B63C 9/0005 |
| D827,733 S | 9/2018 | Hochstrasser |
| 10,065,064 B2 | 9/2018 | Smith et al. |
| 10,071,285 B2 | 9/2018 | Smith et al. |
| 10,085,586 B2 | 10/2018 | Smith et al. |
| 10,086,254 B2 | 10/2018 | Watterson |
| 10,136,842 B2 | 11/2018 | Ashby |
| 10,186,161 B2 | 1/2019 | Watterson |
| 10,188,890 B2 | 1/2019 | Olson |
| 10,207,143 B2 | 2/2019 | Dalebout |
| 10,207,145 B2 | 2/2019 | Tyger |
| 10,207,147 B2 | 2/2019 | Ercanbrack |
| 10,207,148 B2 * | 2/2019 | Powell ............... A63B 22/0023 |
| 10,212,994 B2 | 2/2019 | Watterson |
| 10,220,259 B2 | 3/2019 | Brammer |
| 10,226,396 B2 | 3/2019 | Ashby |
| 10,226,664 B2 | 3/2019 | Dalebout |
| 10,252,109 B2 | 4/2019 | Watterson |
| 10,272,317 B2 | 4/2019 | Watterson |
| 10,279,212 B2 | 5/2019 | Dalebout et al. |
| 10,293,211 B2 | 5/2019 | Watterson et al. |
| D852,292 S | 6/2019 | Cutler |
| 10,335,632 B2 | 7/2019 | Baker |
| 10,343,017 B2 | 7/2019 | Jackson |
| 10,369,449 B2 * | 8/2019 | Russo ................ A63B 71/0054 |
| 10,376,736 B2 * | 8/2019 | Powell ................ H02K 7/1008 |
| D864,320 S | 10/2019 | Weston |
| D864,321 S | 10/2019 | Weston |
| 10,449,416 B2 | 10/2019 | Dalebout |
| 2002/0016235 A1 | 2/2002 | Ashby et al. |
| 2002/0077221 A1 | 6/2002 | Dalebout et al. |
| 2002/0159253 A1 | 10/2002 | Dalebout et al. |
| 2003/0045406 A1 | 3/2003 | Stone |
| 2003/0139259 A1 | 7/2003 | Kuo |
| 2004/0005961 A1 | 1/2004 | Lund |
| 2004/0091307 A1 | 5/2004 | James |
| 2004/0171464 A1 | 9/2004 | Ashby et al. |
| 2004/0171465 A1 | 9/2004 | Hald et al. |
| 2005/0049123 A1 | 3/2005 | Dalebout et al. |
| 2005/0077805 A1 | 4/2005 | Dalebout et al. |
| 2005/0107229 A1 | 5/2005 | Wickens |
| 2005/0164839 A1 | 7/2005 | Watterson et al. |
| 2005/0272577 A1 | 12/2005 | Olson et al. |
| 2007/0117683 A1 | 5/2007 | Ercanbrack et al. |
| 2007/0254778 A1 | 11/2007 | Ashby |
| 2008/0020907 A1 * | 1/2008 | Lin ....................... A61H 1/005 482/54 |
| 2008/0051256 A1 | 2/2008 | Ashby et al. |
| 2008/0176713 A1 * | 7/2008 | Olivera Brizzio ......................... A63B 21/0628 482/8 |
| 2008/0242520 A1 | 10/2008 | Hubbard |
| 2008/0300110 A1 | 12/2008 | Smith et al. |
| 2008/0312048 A1 * | 12/2008 | Cassano ............. A63B 22/0235 482/54 |
| 2009/0105052 A1 | 4/2009 | Dalebout et al. |
| 2009/0124466 A1 | 5/2009 | Zhang |
| 2009/0137367 A1 * | 5/2009 | Hendrickson .......... A63B 24/00 482/54 |
| 2009/0267348 A1 * | 10/2009 | Liebermann ............ B60L 50/40 290/45 |
| 2010/0137105 A1 * | 6/2010 | McLaughlin .......... A63F 13/245 482/8 |
| 2010/0242246 A1 | 9/2010 | Dalebout et al. |
| 2010/0270810 A1 * | 10/2010 | Liebermann ............... B60L 9/00 290/1 A |
| 2011/0031839 A1 * | 2/2011 | Fullerton .............. H01F 13/003 310/152 |
| 2012/0237911 A1 | 9/2012 | Watterson |
| 2012/0295774 A1 | 11/2012 | Dalebout et al. |
| 2013/0123083 A1 | 5/2013 | Sip |
| 2013/0165195 A1 | 6/2013 | Watterson |

(56) References Cited

U.S. PATENT DOCUMENTS

| | | |
|---|---|---|
| 2013/0172152 A1 | 7/2013 | Watterson |
| 2013/0172153 A1 | 7/2013 | Watterson |
| 2013/0175132 A1* | 7/2013 | Battlogg ............... F16D 37/02 |
| | | 192/21.5 |
| 2013/0178334 A1 | 7/2013 | Brammer |
| 2013/0178768 A1 | 7/2013 | Dalebout |
| 2013/0190136 A1 | 7/2013 | Watterson |
| 2013/0196298 A1 | 8/2013 | Watterson |
| 2013/0196821 A1 | 8/2013 | Watterson et al. |
| 2013/0196822 A1 | 8/2013 | Watterson et al. |
| 2013/0211594 A1* | 8/2013 | Stephens, Jr. ............ G06N 3/008 |
| | | 700/259 |
| 2013/0218585 A1 | 8/2013 | Watterson |
| 2013/0244836 A1 | 9/2013 | Maughan |
| 2013/0267383 A1 | 10/2013 | Watterson |
| 2013/0268101 A1 | 10/2013 | Brammer |
| 2013/0274067 A1 | 10/2013 | Watterson et al. |
| 2013/0281241 A1 | 10/2013 | Watterson |
| 2014/0024499 A1 | 1/2014 | Watterson |
| 2014/0073970 A1 | 3/2014 | Ashby |
| 2014/0121071 A1 | 5/2014 | Strom et al. |
| 2014/0135173 A1 | 5/2014 | Watterson |
| 2014/0274574 A1 | 9/2014 | Shorten et al. |
| 2014/0274579 A1 | 9/2014 | Olson |
| 2014/0283728 A1* | 9/2014 | Wang ..................... B63B 35/50 |
| | | 114/261 |
| 2014/0287884 A1 | 9/2014 | Buchanan |
| 2014/0309085 A1 | 10/2014 | Watterson et al. |
| 2015/0182779 A1 | 7/2015 | Dalebout |
| 2015/0182781 A1 | 7/2015 | Watterson |
| 2015/0238817 A1 | 8/2015 | Watterson |
| 2015/0250418 A1 | 9/2015 | Ashby |
| 2015/0251055 A1 | 9/2015 | Ashby |
| 2015/0253210 A1 | 9/2015 | Ashby et al. |
| 2015/0253735 A1 | 9/2015 | Watterson |
| 2015/0253736 A1 | 9/2015 | Watterson |
| 2015/0258560 A1 | 9/2015 | Ashby |
| 2015/0321337 A1* | 11/2015 | Stephens, Jr. ............ B25J 3/00 |
| | | 700/257 |
| 2015/0352396 A1 | 12/2015 | Dalebout |
| 2016/0058335 A1 | 3/2016 | Ashby |
| 2016/0063615 A1 | 3/2016 | Watterson |
| 2016/0092909 A1 | 3/2016 | Watterson |
| 2016/0101311 A1 | 4/2016 | Workman |
| 2016/0107065 A1 | 4/2016 | Brammer |
| 2016/0121074 A1 | 5/2016 | Ashby |
| 2016/0148535 A1 | 5/2016 | Ashby |
| 2016/0148536 A1 | 5/2016 | Ashby |
| 2016/0153508 A1* | 6/2016 | Battlogg ............... A61F 2/6607 |
| | | 74/553 |
| 2016/0158595 A1 | 6/2016 | Dalebout |
| 2016/0206922 A1 | 7/2016 | Dalebout et al. |
| 2016/0250519 A1 | 9/2016 | Watterson |
| 2016/0253918 A1 | 9/2016 | Watterson |
| 2016/0346595 A1 | 12/2016 | Dalebout et al. |
| 2017/0027803 A1* | 2/2017 | Agrawal ................. A61B 5/224 |
| 2017/0036053 A1 | 2/2017 | Smith et al. |
| 2017/0056711 A1 | 3/2017 | Dalebout et al. |
| 2017/0056715 A1 | 3/2017 | Dalebout et al. |
| 2017/0056726 A1 | 3/2017 | Dalebout et al. |
| 2017/0124912 A1 | 5/2017 | Ashby et al. |
| 2017/0129105 A1* | 5/2017 | Stephens, Jr. ............ B25J 11/00 |
| 2017/0189745 A1 | 7/2017 | Hamilton et al. |
| 2017/0193578 A1 | 7/2017 | Watterson |
| 2017/0221657 A1* | 8/2017 | Barker ................... A63B 22/04 |
| 2017/0266481 A1 | 9/2017 | Dalebout |
| 2017/0266483 A1 | 9/2017 | Dalebout et al. |
| 2017/0266489 A1 | 9/2017 | Douglass et al. |
| 2017/0266532 A1 | 9/2017 | Watterson |
| 2017/0270820 A1 | 9/2017 | Ashby |
| 2018/0001135 A1 | 1/2018 | Powell |
| 2018/0036585 A1 | 2/2018 | Powell |
| 2018/0084817 A1 | 3/2018 | Capell et al. |
| 2018/0085630 A1 | 3/2018 | Capell et al. |
| 2018/0085651 A1* | 3/2018 | Russo ................ A63B 24/0087 |
| 2018/0089396 A1 | 3/2018 | Capell et al. |
| 2018/0099116 A1 | 4/2018 | Ashby |
| 2018/0099179 A1 | 4/2018 | Chatterton et al. |
| 2018/0099180 A1 | 4/2018 | Wilkinson |
| 2018/0099205 A1 | 4/2018 | Watterson |
| 2018/0111034 A1 | 4/2018 | Watterson |
| 2018/0117383 A1 | 5/2018 | Workman |
| 2018/0117385 A1 | 5/2018 | Watterson et al. |
| 2018/0117393 A1 | 5/2018 | Ercanbrack |
| 2018/0154205 A1 | 6/2018 | Watterson |
| 2018/0154207 A1 | 6/2018 | Hochstrasser |
| 2018/0154208 A1 | 6/2018 | Powell et al. |
| 2018/0154209 A1 | 6/2018 | Watterson |
| 2018/0200566 A1 | 7/2018 | Weston |
| 2019/0054344 A1 | 2/2019 | Athey |
| 2019/0058370 A1 | 2/2019 | Tinney |
| 2019/0080624 A1 | 3/2019 | Watterson |
| 2019/0151698 A1 | 5/2019 | Olson |
| 2019/0168072 A1 | 6/2019 | Brammer |
| 2019/0178313 A1 | 6/2019 | Wrobel |
| 2019/0192898 A1 | 6/2019 | Dalebout |
| 2019/0192952 A1 | 6/2019 | Powell |
| 2019/0209893 A1 | 7/2019 | Watterson |
| 2019/0223612 A1 | 7/2019 | Watterson |
| 2019/0269958 A1 | 9/2019 | Dalebout et al. |
| 2019/0269971 A1 | 9/2019 | Capell et al. |
| 2019/0275366 A1 | 9/2019 | Powell |
| 2019/0282852 A1 | 9/2019 | Dalebout |
| 2019/0328079 A1 | 10/2019 | Ashby et al. |
| 2019/0329091 A1* | 10/2019 | Powell ............... A63B 24/0062 |
| 2019/0351305 A1* | 11/2019 | Russo ................ A63B 22/025 |

FOREIGN PATENT DOCUMENTS

| | | |
|---|---|---|
| TW | 177052 | 1/1992 |
| TW | M253381 | 12/2004 |
| TW | M254239 | 1/2005 |
| TW | M333198 | 6/2008 |
| TW | I304351 | 12/2008 |
| TW | M517957 | 2/2016 |
| WO | 198907473 | 8/1989 |

OTHER PUBLICATIONS

U.S. Appl. No. 29/702,127, filed Sep. 16, 2019, ICON Health & Fitness, Inc.
U.S. Appl. No. 62/697,833, filed Jul. 13, 2018, ICON Health & Fitness, Inc.
U.S. Appl. No. 62/796,952, filed Jan. 25, 2019, ICON Health & Fitness, Inc.
U.S. Appl. No. 62/804,146, filed Feb. 11, 2019, ICON Health & Fitness, Inc.
U.S. Appl. No. 62/804,685, filed Feb. 12, 2019, ICON Health & Fitness, Inc.
U.S. Appl. No. 62/842,118, filed May 23, 2019, ICON Health & Fitness, Inc.
U.S. Appl. No. 62/852,118, filed May 22, 2019, David Hays.
U.S. Appl. No. 62/866,576, filed Jun. 25, 2019, ICON Health & Fitness, Inc.
U.S. Appl. No. 62/887,391, filed Aug. 15, 2019, ICON Health & Fitness, Inc.
U.S. Appl. No. 62/887,398, filed Aug. 15, 2019, ICON Health & Fitness, Inc.
U.S. Appl. No. 62/897,113, filed Sep. 9, 2019, ICON Health & Fitness, Inc.
U.S. Appl. No. 13/088,007, filed Apr. 15, 2011, Scott R. Watterson.
U.S. Appl. No. 15/821,386, filed Nov. 22, 2017, ICON Health & Fitness, Inc.
U.S. Appl. No. 15/973,176, filed May 7, 2018, Melanie Douglass.
U.S. Appl. No. 16/378,022, filed Apr. 8, 2019, William T. Dalebout.
U.S. Appl. No. 16/435,104, filed Jun. 7, 2019, Dale Alan Buchanan.
U.S. Appl. No. 16/506,085, filed Jul. 9, 2019, ICON Health & Fitness, Inc.

(56) References Cited

OTHER PUBLICATIONS

U.S. Appl. No. 16/572,272, filed Sep. 16, 2019, ICON Health & Fitness, Inc.
Taiwan Search Report and Office Action issued in application No. 106136812 dated Jun. 25, 2018 with English translation.
International Search Report and Written Opinion issued in PCT/US2017/064529 dated Mar. 20, 2018.
Taiwan Search Report and Office Action issued in application No. 106122194 dated Jan. 19, 2018 with English translation.
Darken et al., The Omni-Directional Treadmill: A Locomotion Device for Virtual Worlds, Calhoun: The NPS Institutional Archive Dspace Repository, 1997.

* cited by examiner

SYSTEMS AND METHODS FOR REDUCING RUNAWAY RESISTANCE ON AN EXERCISE DEVICE

RELATED APPLICATIONS

This application is a continuation of U.S. patent application Ser. No. 15/847,279 titled "Cooling an Exercise Device During A Drive Motor Runaway Condition," filed on Dec. 19, 2017, which is incorporated herein by reference in its entirety and which is a continuation-in-part of U.S. patent application Ser. No. 15/730,516 filed on Oct. 11, 2017 and titled "Systems and Methods for Reducing Runaway Resistance on an Exercise Device," now U.S. Pat. No. 10,207,148, which is also herein incorporated by reference in its entirety and which claims priority to U.S. Patent Application Ser. No. 62/407,073 titled "Systems and Methods for Reducing Runaway Resistance on an Exercise Device" and filed on 12 Oct. 2016, which application is also herein incorporated by reference for all that it discloses.

BACKGROUND

Aerobic exercise is a popular form of exercise that improves one's cardiovascular health by reducing blood pressure and providing other benefits to the human body. Aerobic exercise generally involves low intensity physical exertion over a long duration of time. Typically, the human body can adequately supply enough oxygen to meet the body's demands at the intensity levels involved with aerobic exercise. Popular forms of aerobic exercise include running, jogging, swimming, and cycling, among other activities. In contrast, anaerobic exercise typically involves high intensity exercises over a short duration of time. Popular forms of anaerobic exercise include strength training and short distance running.

Many people choose to perform aerobic exercises indoors, such as in a gym or in their home. Often, a user will use an aerobic exercise machine to perform an aerobic workout indoors. One type of aerobic exercise machine is a treadmill, which is a machine that has a running deck attached to a support frame. The running deck can support the weight of a person using the machine. The running deck incorporates a conveyor belt that is driven by a motor. A user can run or walk in place on the conveyor belt by running or walking at the conveyor belt's speed. The speed and other operations of the treadmill are generally controlled through a control module that is also attached to the support frame and within convenient reach of the user. The control module can include a display, buttons for increasing or decreasing a speed of the conveyor belt, controls for adjusting a tilt angle of the running deck, or other controls. Other popular exercise machines that allow a user to perform aerobic exercises indoors include elliptical trainers, rowing machines, stepper machines, and stationary bikes, to name a few.

One type of treadmill is disclosed in U.S. Pat. No. 6,042,513 issued to John Koteles, et al. In this reference, a runaway protection mechanism is provided for use in, for example, an exercise treadmill for driving its moving treadmill belt. According to Koteles, an electric motor is connected to an electric power source, such as an alternating-current wall outlet. The runaway protection mechanism includes a disconnect mechanism for disconnecting the motor from the electric power source and thereby de-energizing the motor during a runaway condition. The runaway protection mechanism further includes a safety mechanism for comparing the actual motor speed with a desired motor speed and activating the disconnect mechanism when the actual speed exceeds the desired speed by a predetermined amount.

SUMMARY

In one embodiment, a treadmill includes a deck, a first pulley incorporated into the deck, a second pulley incorporated into the deck, a tread belt surrounding the first pulley and the second pulley, a drive motor in mechanical communication with at least one of the first pulley and the second pulley to move the tread belt in a first direction, and a runaway load component in electrical communication with the drive motor. The runaway load component draws electrical power generated by the drive motor during a runaway motor condition.

The motor runaway condition can be induced when a user moves the tread belt with a force that is greater than the force outputted by the motor.

The motor runaway condition can exist when a user moves the tread belt at a force that is greater than the force outputted by the motor when an incline angle of the deck exceeds a threshold angle.

The runaway load component can turn on during a motor runaway condition.

The runaway load component can be a dump resistor.

The runaway load component can be located in a housing that contains the drive motor.

The runaway load component can be a cooling fan.

The cooling fan can be positioned to direct an airflow towards the drive motor.

The cooling fan can be located adjacent to a lift motor that controls an elevation for a portion of the deck.

The cooling fan can be positioned to cool a housing that contains the drive motor.

The cooling fan can be positioned to direct an airflow over a dump resistor.

In one embodiment, a treadmill includes a deck, a first pulley incorporated into the deck, a second pulley incorporated into the deck, a tread belt surrounding the first pulley and the second pulley, a drive motor in mechanical communication with at least one of the first pulley and the second pulley to move the tread belt in a first direction, and a cooling fan in electrical communication with the drive motor. The cooling fan draws electrical power generated by the drive motor during a runaway motor condition.

The motor runaway condition can be induced when a user moves the tread belt with a force that is greater than the force that is outputted by the motor.

The motor runaway condition can exist when a user moves the tread belt at a force that is greater than the force that is outputted by the motor when an incline angle of the deck exceeds a threshold angle.

The cooling fan can be positioned to direct an airflow towards the drive motor.

The cooling fan can be located adjacent to a lift motor that controls an elevation for a portion of the deck.

The cooling fan can be positioned to cool a housing that contains the drive motor.

The cooling fan can be positioned to direct an airflow over a dump resistor.

In an embodiment, a treadmill includes a deck, a first pulley incorporated into the deck, a second pulley incorporated into the deck, a tread belt surrounding the first pulley and the second pulley, a housing incorporated into the deck, a drive motor disposed within the housing and in mechanical communication with at least one of the first pulley and the second pulley to move the tread belt in a first direction, a dump resistor in electrical communication with the drive motor, and a cooling fan disposed within the housing and in electrical communication with the drive motor. The cooling fan draws electrical power generated by the drive motor during a runaway motor condition. The dump resistor also draws power from the drive motor during the runaway motor condition. The motor runaway condition exists the user moves the tread belt at the force that is greater than that which is outputted with the motor when an incline angle of the deck exceeds a threshold angle.

DETAILED DESCRIPTION

For purposes of this disclosure, the term "aligned" means parallel, substantially parallel, or forming an angle of less than 35.0 degrees. For purposes of this disclosure, the term "transverse" means perpendicular, substantially perpendicular, or forming an angle between 55.0 and 125.0 degrees. Also, for purposes of this disclosure, the term "length" means the longest dimension of an object. Also, for purposes of this disclosure, the term "width" means the dimension of an object from side to side. Often, the width of an object is transverse the object's length. For the purposes of this disclosure, an "output speed" generally refers to a speed of the motor's drive shaft that correlates to the amount of electricity supplied to the motor. Such an output speed can be affected, but not controlled, by the mechanical load on the motor because the amount of electricity supplied to the motor can varying depending on the motor's mechanical load. Additionally, for the purposes of this disclosure, the term "runaway" generally refers to instances where the drive shaft operates at an actual speed that is inconsistent the motor's output speed. Examples of runaway motor condition include where drive shaft is turned in reverse, the drive shaft rotates at a speed faster than the output speed, other conditions, or combinations thereof.

Further, for the purposes of this disclosure, the term "runaway mitigation" can generally refer to at least bringing the output speed and the actual speed of the drive shaft into closer alignment. In some cases, a runaway mitigation mechanism increases a mechanical load on the motor. Under some conditions, the runaway condition causes the electrical motor to generate electricity. For purposes of this disclosure, the term "runaway load component" is a component that is in electrical communication with the motor and draws on the power generated by the motor, at times during a runaway condition, not the power source that provided electrical power to the motor. In some cases, the runaway load component is a cooling fan.

Figure 1:
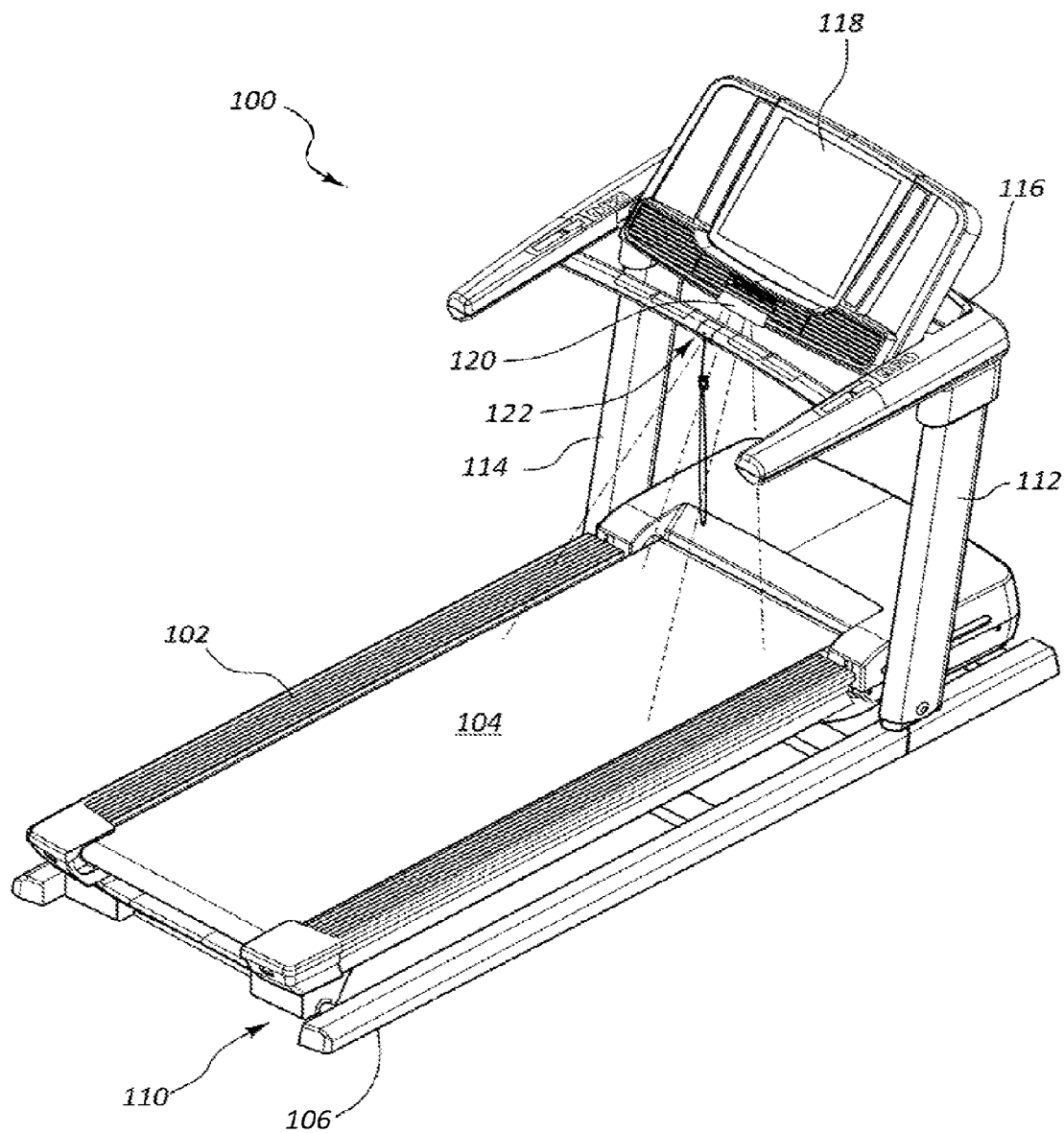
FIG. 1 depicts an example of a treadmill in accordance with aspects of the present disclosure.

FIG. 1 depicts an example of a treadmill 100 having a deck 102 with a first pulley disposed in a front portion of the deck 102 and a second pulley incorporated into a rear portion of the deck 102. A tread belt 104 surrounds the first pulley and the second pulley. A motor is in mechanical communication with either the first pulley or the second pulley. A motor (not shown) drives the tread belt 104. With the deck 102 oriented in a substantially horizontal position, a user's body weight pushes the underside of the tread belt 104 into the deck's upper surface, which generates an amount of friction between the belt and the deck, which increases the load on the motor. Additionally, the tread belt carries the portion of the user's weight along the length of the deck as the motor operates, which also increases the load on the motor.

The rear portion of the deck 102 is attached to a base member 106 of the treadmill's frame 108. A pivot connection 110 between the rear portion of the deck 102 and the base member 106 allows the front portion of the deck 102 to incline upwards or decline downwards. When the deck 102 inclines or declines, the base member 106 remains stationary.

A first side post 112 is attached to a first side of the base member 106, and a second side post 114 is attached to a second side of the base member 106. In the example depicted in FIG. 1, the first side post 112 and the second side post 114 also remain stationary as the deck 102 inclines and/or declines. The first side post 112 and the second side post 114 collectively support a console 116. The console 116 includes a display 118 and an input mechanism 120 for controlling the deck's incline angle.

Figure 2:
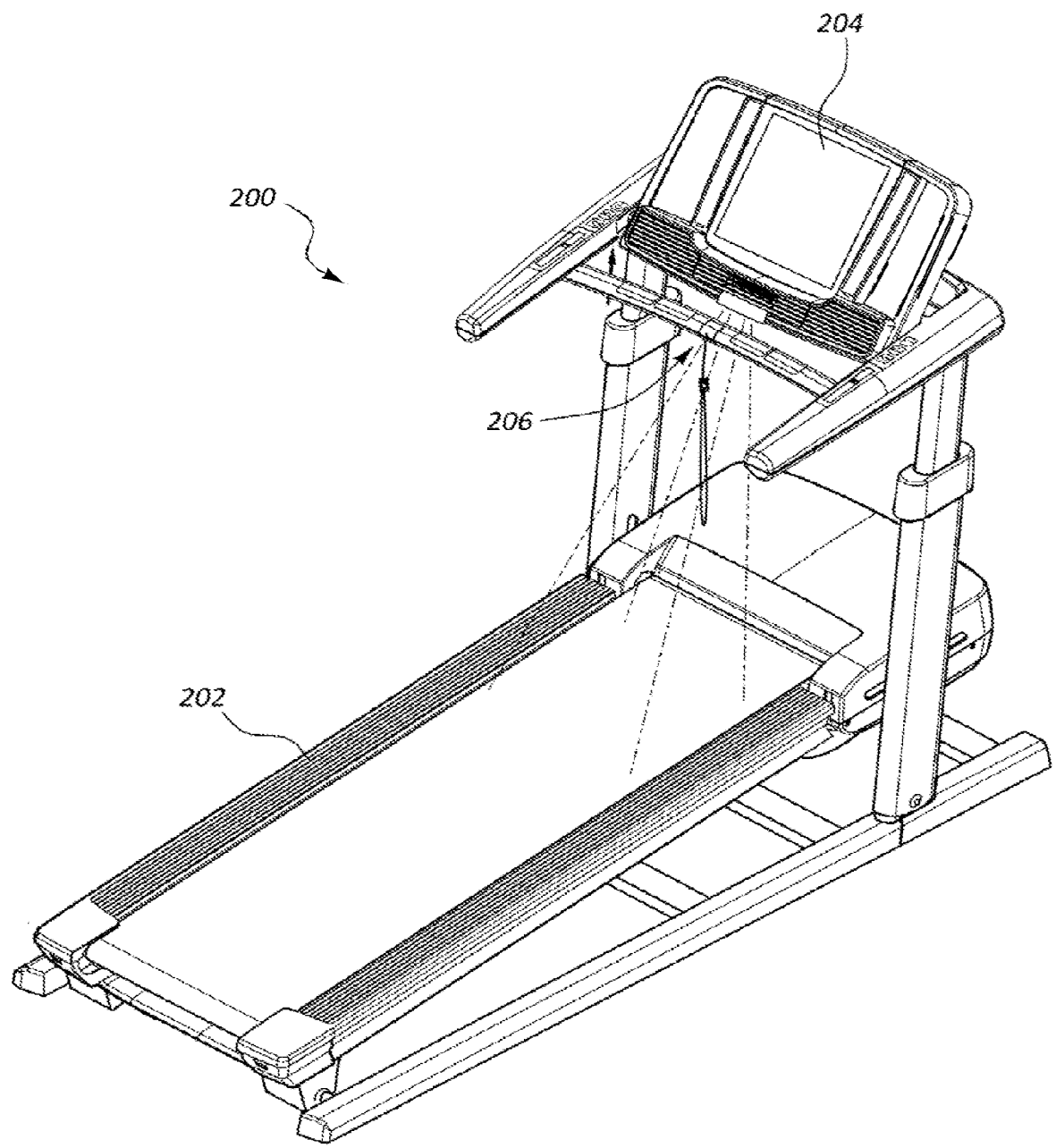
FIG. 2 depicts an example of a treadmill in accordance with aspects of the present disclosure.

FIG. 2 depicts an example of a treadmill 200. In this example, the deck 202 is inclined so that the front portion of the deck 202 is elevated. At this inclined angle, the user can perform an exercise on the deck 202. At the inclined angle, gravity pulls on the user's mass, which offsets at least some of the mechanical load on the motor for driving the tread belt as the user pushes against the tread belt during the performance of an exercise. Often, the power supplied to the motor is reduced accordingly to slow the tread belt and keep the tread belt traveling at the desired, consistent speed. Under these conditions, the tread belt is still traveling at the output speed that is consistent with the amount of electricity supplied to the motor because the amount of electricity supplied is reduced to be consistent with the reduced mechanical load. At some angles, the user's body weight applies a force sufficiently large that the motor receives a minimal amount of electrical power to keep the tread belt operating at the output speed.

However, in some circumstances, the summation of the angle of the deck, the weight of the user, the friction between the tread belt and the deck, other factors, or combinations thereof cause the drive shaft's motor to rotate at a faster speed than the output speed of the motor. This condition can be referred to as a runaway condition. While this example is described as a runaway condition, in other case, the runaway condition can be caused by a different set of circumstances. The runaway condition can cause the motor to generate electrical power and/or cause damage to the motor or other components of the treadmill.

Figure 3:
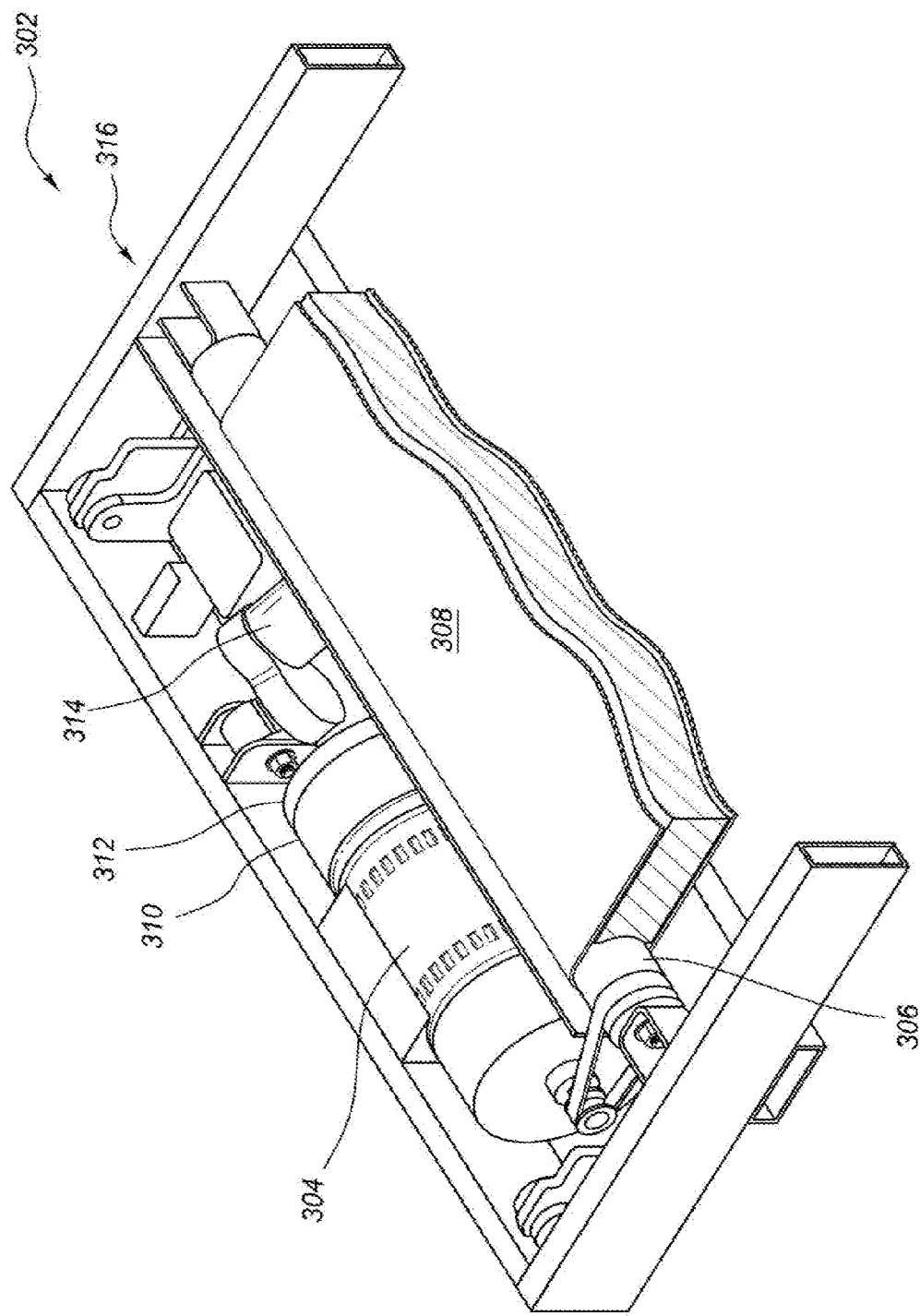
FIG. 3 depicts a partial cut-away view of an example of a treadmill motor in accordance with aspects of the present disclosure.

FIG. 3 illustrates an example of a treadmill 302 with a portion of the housing removed for illustrative purposes. Inside the housing, a drive motor 304 is disposed adjacent to a pulley 306 that moves the tread belt 308 in a rotational direction. The drive motor 304 is attached to the pulley 306 with a drive shaft. A power supply (not shown) supplies power to the motor to drive the rotation of the drive shaft. The power supply can be an external source, such as an alternating current system incorporated into a residence or other building, a generator, an alternative power source, another type power source, or combinations thereof. In some instances, the power supply can be internal to the housing and/or treadmill 302. Attached to and coaxial with the drive motor 304 is a flywheel 310. The flywheel 310 rotates with the drive motor 304.

A lift motor 314 is connected to the deck 316 and also to the base frame (not shown) of the treadmill. When activated, the lift motor 314 causes a rod to extend downward, which pushes against the front portion of the deck and the base frame causing the front portion of the deck to raise. In other situations, when the lift motor 314 is activated, the rod is retracted, which causes the front portion of the deck to lower. In these cases, the lift motor 314 can be transversely oriented with respect to the fan assembly 312. While this example has been described as having a lift motor as part of a system for inclining the deck, any appropriate mechanism can be used to incline the deck.

Figure 4:
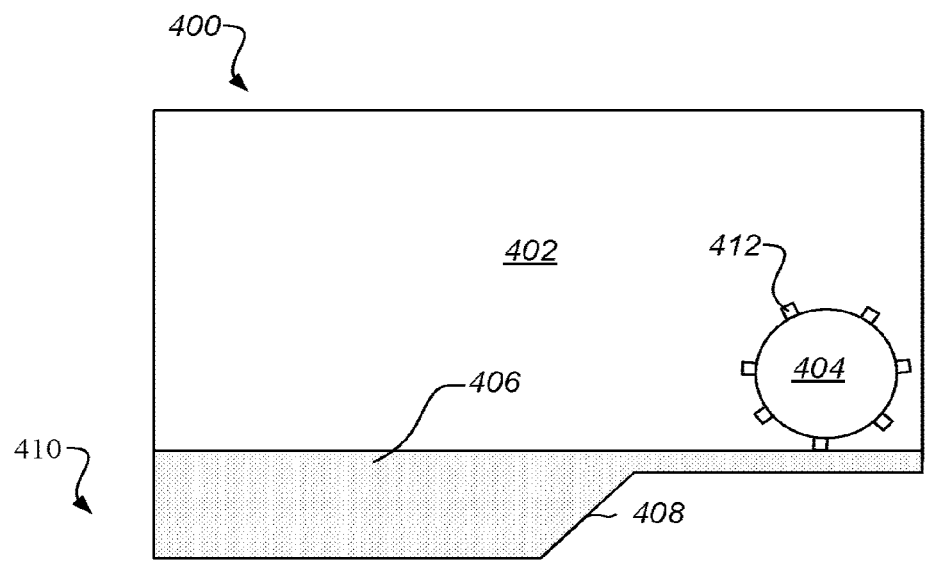
FIG. 4 depicts an example of a runaway mitigation mechanism in accordance with aspects of the present disclosure.

FIG. 4 depicts an example of a runaway mitigation mechanism 400. In this example, the runaway mitigation mechanism 400 includes a container 402 and a portion of the drive shaft 404 is partially disposed within the container 402. The container 402 includes a fluid 406, such as an oil-based or other viscous fluid. In some cases, the container 402 moves with the deck. When the deck is in a level orientation, the container is held at a corresponding orientation. On the other hand, when the deck is inclined at an angle, the container 402 is held in a tilted orientation.

In the level orientation, the fluid 406 resides under the drive shaft 404 without making contact with the drive shaft 404. In the illustrated example, the container 402 includes a trough 408 defined in the far portion 410 of the container 402 where the fluid 406 can pool away from the drive shaft 404. In alternative embodiments, no trough is included.

In the illustrated example, at least one vane 412 is attached to the drive shaft 404. While this example has been depicted with a vane, any appropriate number or shape of vanes can be incorporated into the drive shaft 404.

Figure 5:
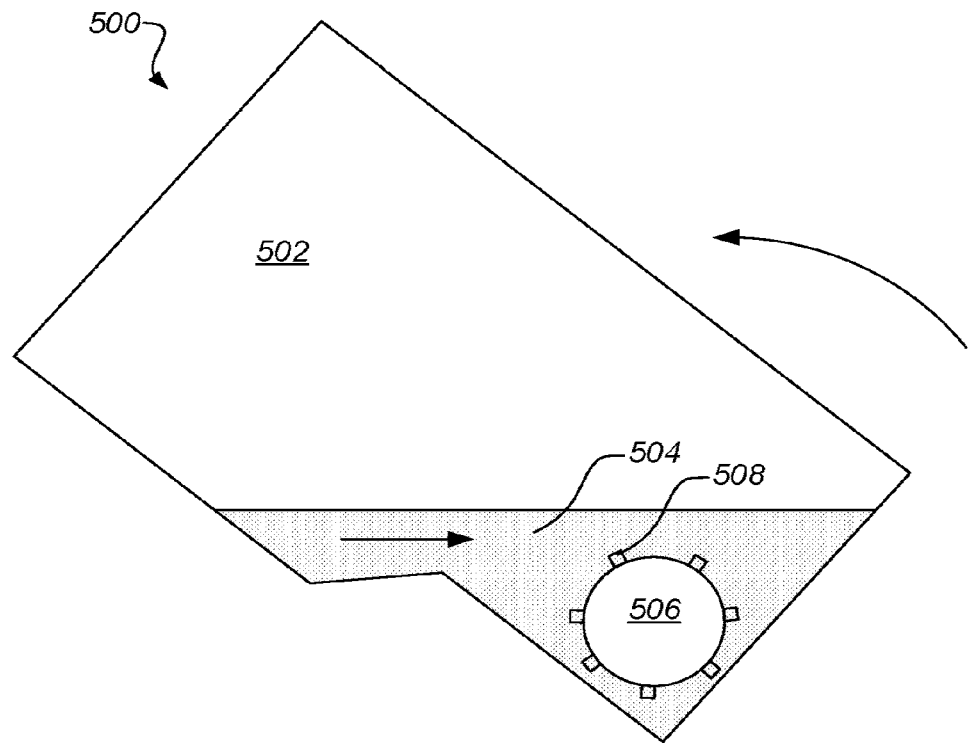
FIG. 5 depicts an example of a runaway mitigation mechanism in accordance with aspects of the present disclosure.

FIG. 5 depicts an example of a runaway mitigation mechanism 500 where the container 502 is oriented in a tilted orientation. With the container 502 in a tilted orientation, the fluid 504 pools in the proximity of the drive shaft 506 so that the fluid 504 is in contact with the drive shaft 506. In the illustrated example, the drive shaft 506 is immersed in the fluid 504 so that an entire circumference of the drive shaft 506 is in contact with the fluid 504. In some examples, the contact with the drive shaft 506 resists rotation of the drive shaft 506. In some cases, the viscosity of the fluid 504 resists the movement of the vanes 508.

Figure 6:
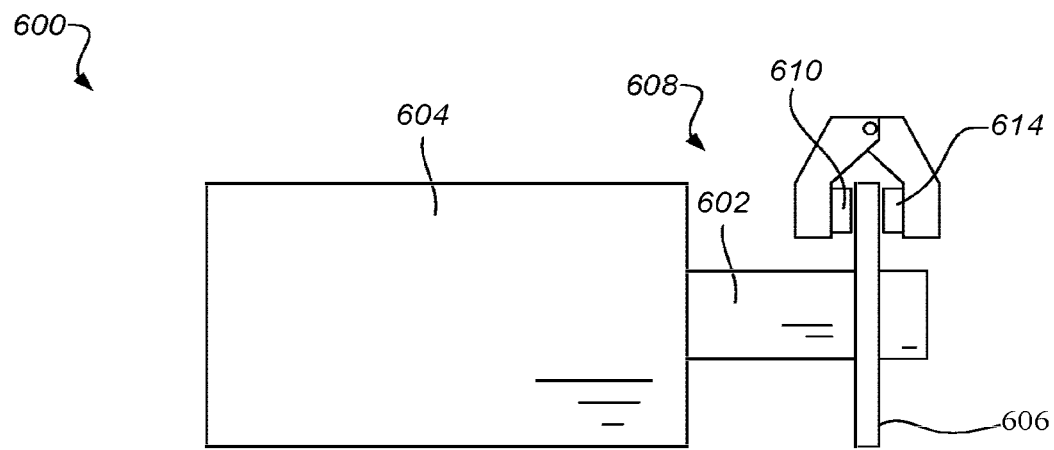
FIG. 6 depicts an example of a runaway mitigation mechanism in accordance with aspects of the present disclosure.

FIG. 6 depicts an example of a runaway mitigation mechanism 600. In this example, a drive shaft 602 extends beyond a motor casing 604, and a rotary disc 606 is rigidly attached to the drive shaft 602. A compression brake 608 is positioned adjacent to the rotary disc 606. The compression brake 608 includes a first pad 610 adjacent a first side of the rotary disc 606, and a second pad 614 adjacent a second side of the rotary disc 606. When activated, the first pad 610 and the second pad 614 move towards the rotary disc 606 simultaneously and apply a compressive load to the rotary disc 606 which resists rotational movement of the rotary disc 606. This increases the mechanical load on the motor because of the increased resistance to rotate the drive shaft 602. Under certain conditions, the compression brake 608 applies a compressive load that is sufficient to prevent the rotary disc 606, and therefore the drive shaft 602, from rotating at all. Under other conditions, the compression brake 608 can apply a compressive load that merely increases the resistance to the rotational movement of the rotary disc 606, but is not sufficient to stop the drive shaft 602 from rotating. When a runaway condition is sensed or at least determined to exist, the compression brake 608 can be activated to increase the mechanical resistance to the motor to at least mitigate the runaway condition.

Figure 7:
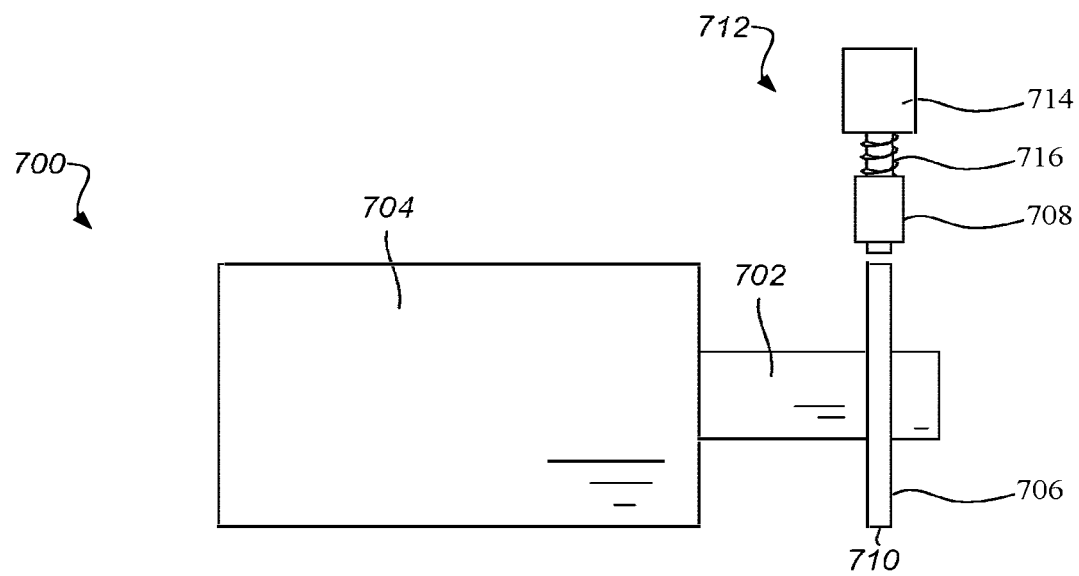
FIG. 7 depicts an example of a runaway mitigation mechanism in accordance with aspects of the present disclosure.

FIG. 7 depicts an example of a runaway mitigation mechanism 700. In this example, a drive shaft 702 extends beyond a motor casing 704, and a rotary disc 706 is rigidly attached to the drive shaft 702. In the illustrated example, the rotary disc 706 includes at least some magnetically conductive material. A magnetic unit 708 is positioned adjacent to the rim 710 of the rotary disc 706. The magnetic unit 708 can apply a magnetic force on the rotary disc 706 that resists movement of the rotary disc 706 and therefore movement of the drive shaft 702.

The magnetic unit 708 is positionable with a linear actuator 712. The linear actuator 712 includes an actuator motor 714 and a screw rod 716. As the motor operates in a first direction, the screw rod 716 moves the magnetic unit 708 in a direction towards the rotary disc 706. As the motor operates in a second direction, the screw rod 716 moves the magnetic unit 708 in another direction away from the rotary disc 706. As the magnetic unit 708 approaches the rotary disc 706, the magnetic load applied to the rotary disc 706 increases so that more resistance is applied to the rotary disc's movement and mechanical resistance on the motor increases. As the magnetic unit 708 moves away from the rotary disc 706, the magnetic load on the rotary disc 706 decreases, which lowers mechanical resistance on the motor. In alternative embodiments, the magnetic unit is an electromagnet that produces a magnetic field that is proportional to the power supplied to the magnetic unit. In this example, the magnetic strength applied to the rotary disc is adjustable by varying the power to the magnetic unit.

Figure 8:
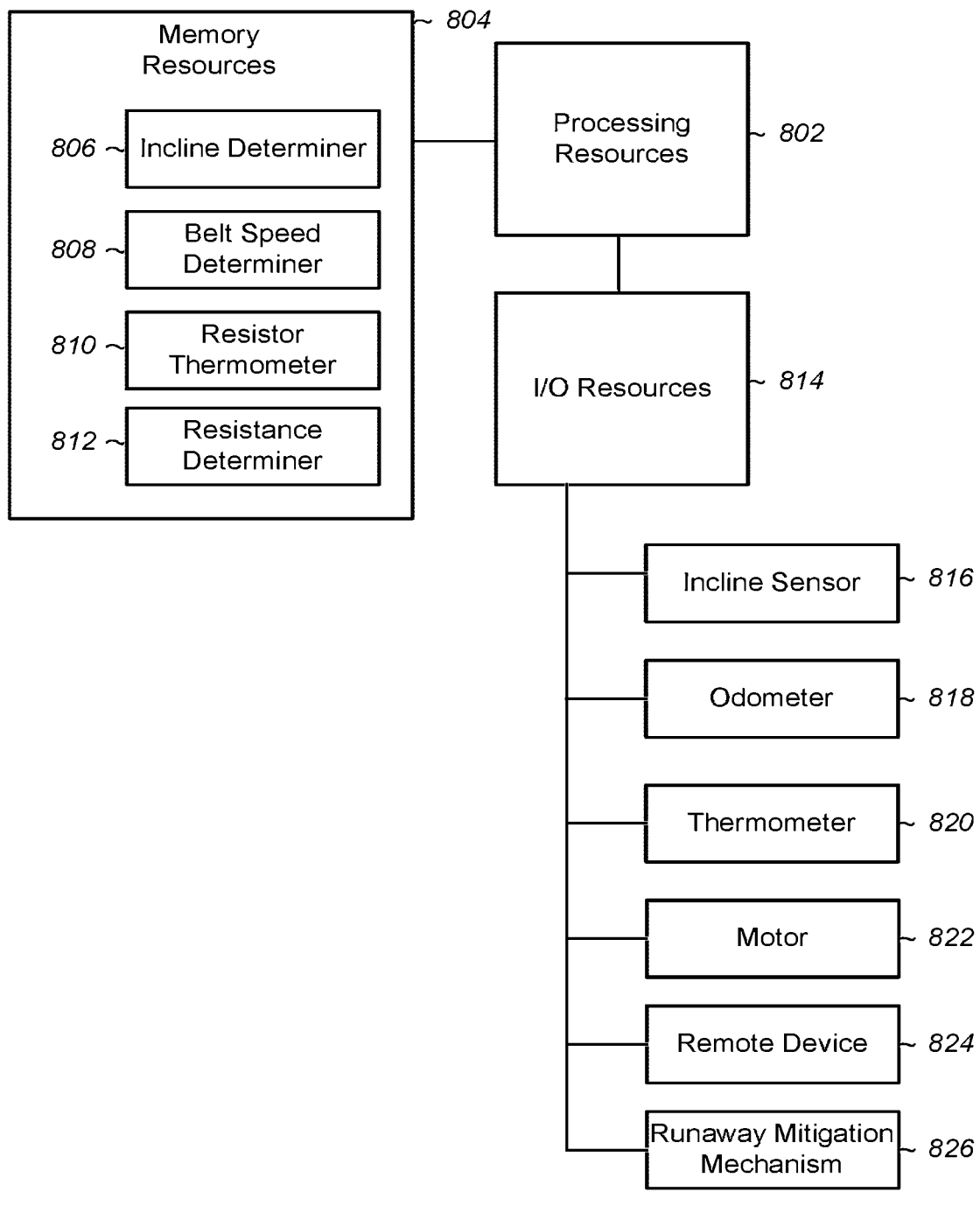
FIG. 8 depicts a block diagram of an example of a runaway mitigation system in accordance with aspects of the present disclosure.

FIG. 8 illustrates a perspective view of an example of a runaway mitigation system 800 in accordance with the present disclosure. The runaway mitigation system 800 can include a combination of hardware and programmed instructions for executing the functions of the runaway mitigation system 800. In this example, the runaway mitigation system 800 includes processing resources 802 that are in communication with memory resources 804. Processing resources 802 include at least one processor and other resources used to process the programmed instructions. The memory resources 804 represent generally any memory capable of storing data such as programmed instructions or data structures used by the runaway mitigation system 800. The programmed instructions and data structures shown stored in the memory resources 804 include an incline determiner 806, a belt speed determiner 808, a resistor thermometer 810, and a resistance determiner 812.

Input/output (I/O) resources 814 are in communication with the processing resources 802. The I/O resources 814 can include any appropriate type of mechanism for communicating with remote devices. For example, the I/O resources 814 can include a transmitter, a wireless transmitter, a receiver, a transceiver, a port for receiving an external memory, a network interface, another I/O resource, or combinations thereof.

The I/O resources can be in communication with any appropriate device. In the illustrated example, the I/O resources 814 are in communication with an incline sensor 816, an odometer 818, a thermometer 820, a motor 822, another remote device 824, a runaway mitigation mechanism 826, or combinations thereof. These remote devices can be located on the treadmill, can be independent of the treadmill, can be in communication with the I/O resources over a network, can be part of a wearable device, or combinations thereof.

Figure 9:
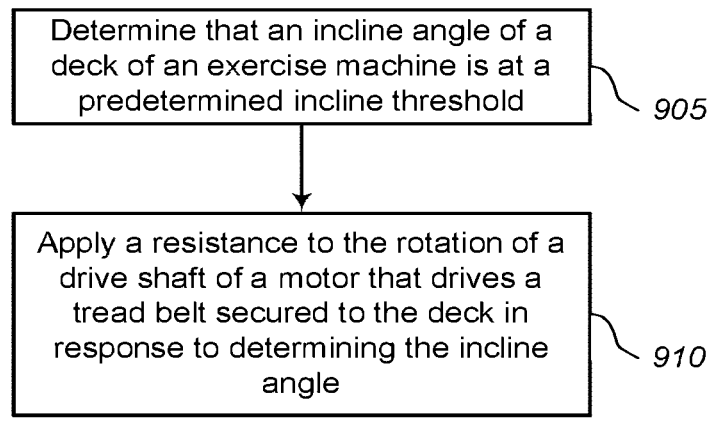
FIG. 9 depicts an example of a method for mitigating runaway on a treadmill motor in accordance with aspects of the present disclosure.

FIG. 9 shows a flowchart illustrating a method 900 for mitigating a runaway condition. The operations of method 900 can be implemented by a runaway mitigation system or its components as described herein. In some examples, a runaway mitigation system can execute a set of codes to control the functional elements of the device to perform the functions described below. Additionally or alternatively, the runaway mitigation system can perform aspects the functions described below using special-purpose hardware. At block 905, an incline angle of the deck of an exercise machine is determined to be at a predetermined incline threshold. At block 910, a resistance is applied to the rotation of a drive shaft of a motor that drives a tread belt secured to the deck in response to determining the incline angle.

Figure 10:
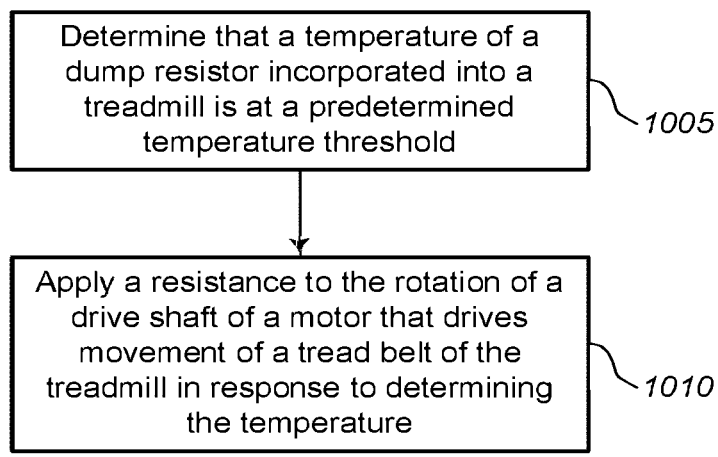
FIG. 10 depicts an example of a method for mitigating runaway on a treadmill motor in accordance with aspects of the present disclosure.

FIG. 10 shows a flowchart illustrating a method 1000 for mitigating a runaway condition. The operations of method 1000 can be implemented by a runaway mitigation system or its components as described herein. In some examples, a runaway mitigation system can execute a set of codes to control the functional elements of the device to perform the functions described below. Additionally or alternatively, the runaway mitigation system can perform aspects the functions described below using special-purpose hardware. At block 1005, a temperature of a dump resistor incorporated into a treadmill is determined to be at a predetermined temperature threshold. At block 1010, a resistance is applied to the rotation of a drive shaft of a motor that drives movement of a tread belt of the treadmill in response to determining the temperature.

Figure 11:
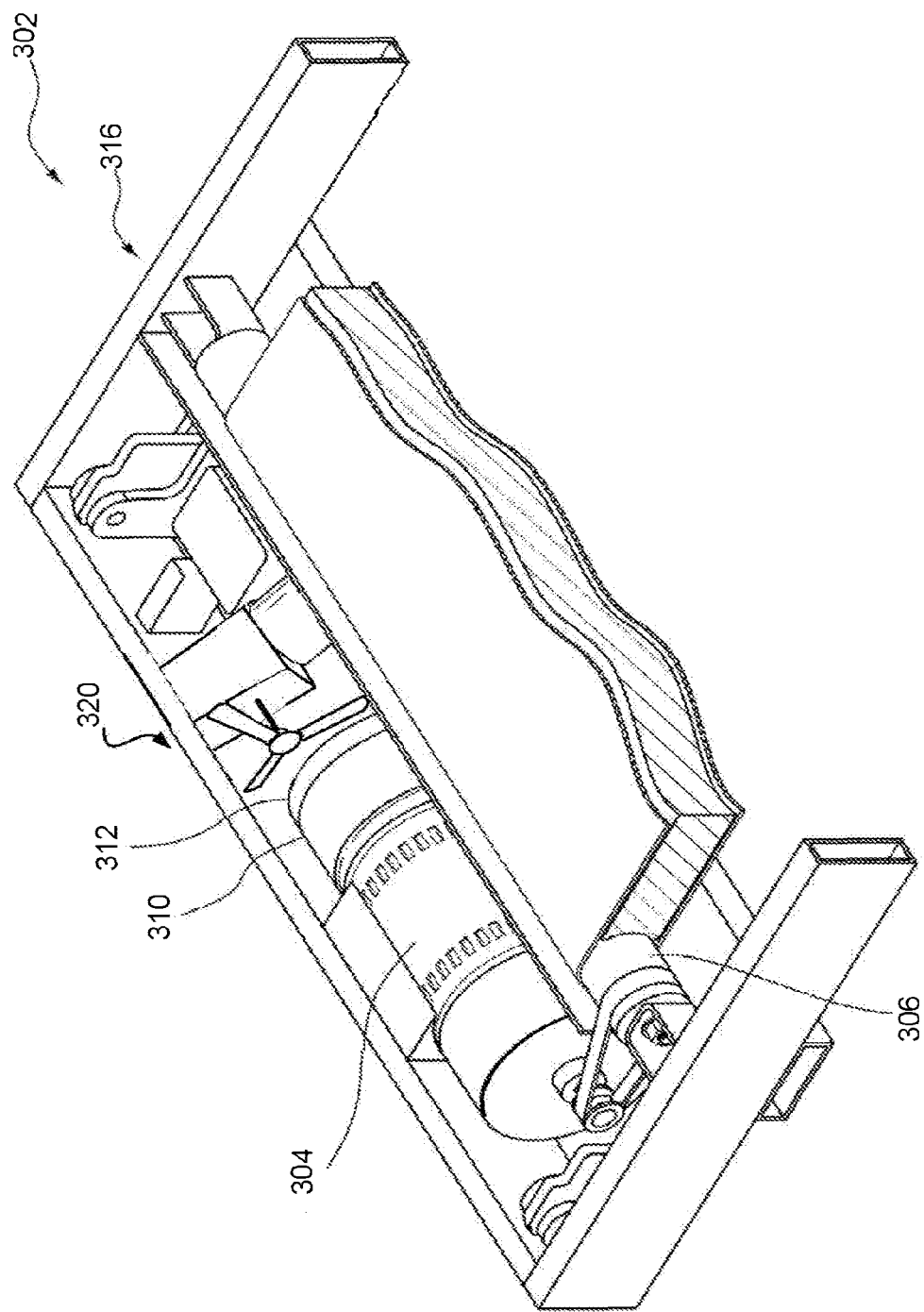
FIG. 11 depicts an example of a treadmill motor in accordance with aspects of the present disclosure.

FIG. 11 depicts an example of a treadmill 302 with a portion of the housing removed for illustrative purposes. Inside the housing, a drive motor 304 is disposed adjacent to a pulley 306 that moves the tread belt 308 in a rotational direction. The drive motor 304 is attached to the pulley 306 with a drive shaft. A power supply (not shown) supplies power to the drive motor 304 to drive the rotation of the drive shaft. Attached to and coaxial with the drive motor 304 is a flywheel 310. The flywheel 310 rotates with the drive motor 304. A lift motor 314 is connected to the deck 316 and also to the base frame (not shown) of the treadmill. A cooling fan 320 is located within the housing and is adjacent to the drive motor 304 and flywheel 310. The cooling fan 320 is positioned to direct an airflow over the drive motor 304 and or lift motor.

Figure 12:
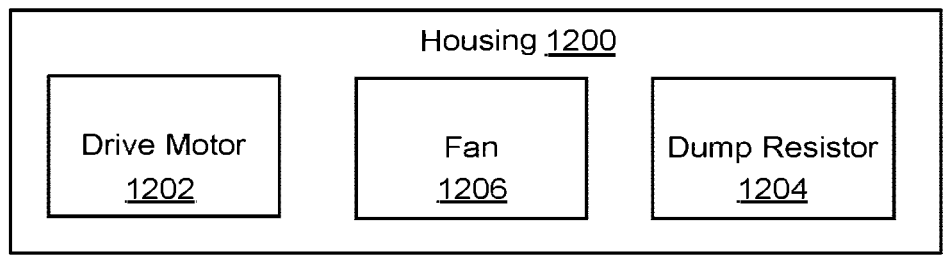
FIG. 12 depicts an example of a housing in accordance with aspects of the present disclosure.

FIG. 12 depicts an example of a housing 1200 incorporated into a treadmill deck. The housing 1200 includes a drive motor 1202, a dump resistor 1204, and a cooling fan 1206. During a runaway motor condition, the dump resistor 1204 and the cooling fan 1206 can both draw on the electrical power generated by the drive motor 1202. As a result, the dump resistor 1204 and the cooling fan 1206 can dissipate the electrical power generated by the drive motor 1202.

GENERAL DESCRIPTION

In general, the systems and methods disclosed herein can provide users with an exercise machine that mitigates the effects of motor runaway. Not all commercial treadmills experience motor runaway due to a deck incline angle. However, in some cases where the treadmill deck inclines at a steeper angle than the industry's conventional treadmills do, the mechanical load on the treadmill motor can drop to a point where the motor that drives the tread belt experiences a runaway condition. In some situations, a runaway condition can result in the motor producing electricity. This electricity has to be directed somewhere, and in some cases, the runaway electricity is directed to a dump resistor where the excess electricity is converted to heat. This excess heat can raise the temperature of other components in the treadmill, which can reduce their useful life.

The load on the motor can be affected by multiple factors, such as the weight of the user, the angle of the deck, the friction between the tread belt and the deck's platform, the friction of the pulleys, the weight of the pulleys, the weight of the tread belt, other factors, or combinations thereof. When the angle of the treadmill's deck is substantially horizontal, the tread belt moves the user along the length of the deck. As the angle of the deck inclines, the user's mass interacts with gravity and pushes down on the tread belt as the user performs an exercise. For example, as the user applies a load on the tread belt when he or she pushes off of the tread belt during a walking or running exercise, the leg applies a downward force on the tread belt which helps move the tread belt along in the same direction that the motor is driving the tread belt. The amount of force that contributes to the movement of the tread belt from the user depends in part on how hard the user applies the force and also the steepness of the incline angle. As a general rule, the steeper the incline angle, the more force that the user applies due to gravity pulling on the user. The weight of the user also affects the load to the tread belt as a heavier user can apply a greater load to the tread belt.

With the load applied by the user's weight moving the tread belt, at least in part, the electrical load on the motor can be reduced to keep the tread belt moving at the desired speed. In some cases, the weight of the user can cause the tread belt to move faster than the speed that the motor would otherwise run given the power load and the angle. In these cases, the motor can generate electricity as part of a runaway condition.

A runaway mitigation mechanism can apply an increased load on the motor, which can result in mitigating and/or eliminating the runaway condition. When mitigating the runaway condition, the amount of electricity produced by the motor can be reduced or entirely eliminated.

The treadmill can include a frame, a deck attached to the frame, and a tread belt incorporated into the deck. The frame can include a base portion that supports the deck on a support surface, such as a floor. A front pulley can be connected to a front portion of the deck, and a rear pulley can be connected to a rear portion of the deck. A tread belt surrounds the front pulley and the second pulley. A motor can drive either the front pulley or the rear pulley and cause the tread belt to move along a surface of the deck. The speed of the tread belt can be adjustable based on the motor's output. In some cases, the user can select the tread belt's speed through an input incorporated into the treadmill.

In some examples, the treadmill includes an incline mechanism that is integrated into the base and controls an elevation of the front portion of the deck. The rear portion of the deck is connected to the base at a pivot connection. As the incline mechanism changes the elevation of the front portion of the deck, the rear portion of the deck remains connected to the base, thus, the front portion of the deck inclines with respect to the base.

In some examples, the treadmill includes an upright structure that is connected to the base. In these examples, the upright structure includes a first post and a second post. The first post and the second post can include a console. The console can include an input mechanism that controls an operational parameter of the treadmill. In some cases, the console includes a cooling mechanism (e.g. fan), speakers, microphones, sensors, other features, or combinations thereof. In some cases, the console includes a display.

In some cases, the motor is located inside of a housing. The drive motor can be disposed adjacent to a pulley that moves the tread belt in a rotational direction. The drive motor can be attached to the pulley with a drive shaft. A power supply can provide power to the motor to drive the rotation of the drive shaft. The power supply can be an external source, such as an alternating current system incorporated into a residence or other building, a generator, an alternative power source, another type power source, or combinations thereof. In some instances, the power supply can be internal to the housing and/or treadmill. In some cases, a flywheel is attached to and coaxial with the drive motor. The flywheel can rotate with the drive motor.

A lift motor can be connected to the deck and to the base frame of the treadmill. When activated, the lift motor can cause a rod to extend downward, which pushes against the front portion of the deck and the base frame causing the front portion of the deck to raise. In other situations, when the lift motor can be activated, the rod is retracted, which causes the front portion of the deck to lower. In these cases, the lift motor can be transversely oriented with respect to the fan assembly. While this example has been described with having a lift motor as part of a system for inclining the deck, any appropriate mechanism can be used to incline the deck.

In those examples where the treadmill includes a console display, the console display can depict information about the user, the operational parameters of the treadmill, entertainment, other features, or combinations thereof. In those examples where the exercise machine is without a console, the exercise machine can be less expensive to manufacture, move, set up, transport, or combinations thereof.

The exercise machine can collect data about the user's physiological condition during the performance of an exercise. In some cases, sensors are incorporated into the exercise machine to gather specific types of physiological information about the user. These sensors can be located on the exercise machine where the user comes into contact with the exercise machine. For example, an electrical contact that is part of a heart rate monitoring system can be incorporated into hand rails, handles, or other types of supports incorporated into the exercise machine. The electrical contacts can detect electrical pulses transmitted through the user's body during the exercise, and these measurements can be used to determine the user's heart rate.

The existence of a runaway condition can be determined through any appropriate mechanism. For example, a current measuring device can determine if electricity is being generated by the motor. In those circumstances where the electricity is being generated by the motor, the processing resources can determine that a runaway condition exists. Any appropriate type of device to measure the amount of power produced by the motor can be used. In some examples, an ohmmeter, an ammeter, a multimeter, a capacitor, another type of measurement device, or combinations thereof can be used. In some cases, any electricity that is generated can be directed to a dump resistor where the electricity is converted to heat. A thermometer can be used to measure the dump resistor's temperature. In those cases where the thermometer records that the dump resistor's temperature is above a baseline temperature, the processing resources can determine that a runaway condition exists.

In other examples, a runaway condition can be presumed when the incline of the deck is above a certain threshold. While other factors can affect when a runaway condition exists, like the user's weight, the sensing electronics can be simplified by presuming that a runaway condition exists solely based on the deck's incline angle. In some cases when the runaway condition is presumed, the processing resources can determine that a runaway condition exists. In this type of example, the mechanical resistance on the motor can be increased regardless of whether an actual runaway condition exists or not. In other circumstances, the processing resources can initiate additional tests when a presumption of a runaway condition exists and initiate a runaway mitigation procedure in response to the findings of those tests.

In some cases, the user's weight is known to the processing resources or at least determinable. For example, the user can input his or her weight into an input mechanism incorporated into the console or through a remote device in communication with the treadmill. The weight of the user can determine which incline angle is classified as a runaway condition threshold angle. In other examples, the requested speed of the tread belt also affects which incline angle is classified as a runaway condition threshold angle.

In other examples, a rotary sensor is associated with the drive shaft, a flywheel, a pulley, another rotary device, or combinations thereof that determine how fast these components are operating. The speed that the motor should be running based on the amount of electricity inputted into the motor can be compared with the actual speed of the motor to determine whether a runaway condition exists.

In another example, the motor is determined to be in a runaway condition if the angle the incline deck is above a predetermined threshold angle. In some cases, this predetermined threshold angle is adjustable based on the weight of the user, the inputted speed for the tread belt to move, other factors, or combinations thereof.

In some examples, when the drive motor is in a runaway condition, the motor produces electrical power. In some instances, the electrical power is directed to a runaway load component. In some cases, the runaway load component is a dump resistor, which converts the electrical power to heat. In other examples, the runaway load component is a cooling fan, a message mechanism that alerts the user to the situation, a magnetic mechanism that increases a magnetic flux on a device that increases a resistance to move the treadmill or another object, a light, a speaker, a wireless profile mechanism, another device, or combinations thereof.

In those examples, where the runaway load component is a cooling fan, any appropriate type of cooling fan can be used. In some examples, the cooling fan is a centrifugal fan, a cross-flow fan, an axial flow fan, and other type of fan or combinations thereof. In some examples, a fan be integrated into the flywheel that is attached to the drive motor. In those situation, the cooling fan can further contribute to the cooling of the housing.

The cooling fan can be located at any appropriate location. In some cases, the cooling fan is located in the same housing as the drive motor. In other examples, the cooling fan is disposed in another housing that contains components other than the drive motor. In yet other cases, the drive motor is not disposed within a housing. In one example, the cooling fan is incorporated into the console of the treadmill's upright structure and is positioned to direct an airflow towards a user performing an exercise on the treadmill. The cooling fan can be located and oriented to direct an airflow over other components of the treadmill and/or user. For example, the cooling fan can be positioned and oriented to cool a lift motor, a drive motor, a bearing, a battery, a dump resistor, a pulley, a user, an ambient environment, a user's hand, another user body part, a user's water bottle, another treadmill component, another component, or combinations thereof.

The cooling fan can be located within the same housing in which the drive motor, lift motor, or another motor is located. In some cases, these motors or other devices are heat sensitive, and the cooling fan can cool the components within the housing. In those situations where the electricity generated by the drive motor is directed to a dump resistor when a runaway condition exists, the cooling fan can be directed to cool the dump resistor. In some cases, the cooling fan and the dump resistor both draw power from the drive motor. In some of these situations, the cooling fan can draw the entire amount of electricity provided from the drive motor. As more electricity is generated, the cooling fan can increase its rotational speed, thereby drawing on the larger amount of electricity. As the amount of electricity continues to increase even more, the cooling fan cannot use any more electricity. At that point, the extra amount of electricity can flow to the dump resistor. In alternative examples, the dump resistor and cooling fan can both draw from the drive motor even if just a small amount of electricity is produced.

The runaway mitigation system can include a combination of hardware and programmed instructions for executing the functions of the runaway mitigation system. In this example, the runaway mitigation system includes processing resources that are in communication with memory resources. Processing resources include at least one processor and other resources used to process the programmed instructions. The memory resources represent generally any memory capable of storing data such as programmed instructions or data structures used by the runaway mitigation system. The programmed instructions and data structures shown stored in the memory resources include an incline determiner, a belt speed determiner, a resistor thermometer, and a resistance determiner.

Input/output (I/O) resources are in communication with the processing resources. The I/O resources can include any appropriate type of mechanism for communicating with remote devices. For example, the I/O resources can include a transmitter, a wireless transmitter, a receiver, a transceiver, a port for receiving an external memory, a network interface, another I/O resource, or combinations thereof.

The I/O resources can be in communication with any appropriate device. In the illustrated example, the I/O resources are in communication with an incline sensor, an odometer, a thermometer, a motor, another remote device, a runaway mitigation mechanism, or combinations thereof. These remote devices can be located on the treadmill, can be independent of the treadmill, can be in communication with the I/O resources over a network, can be part of a wearable device, or combinations thereof. Such protocols can include standard wireless protocols, protocols used by Bluetooth® technologies, Wi-Fi protocols, Z-wave protocols, Zigbee protocols, other types of wireless protocols, or combinations thereof.

The processing resources can include more or more processors. The processing resources can include an intelligent hardware device, (e.g., a general-purpose processor, a digital signal processor (DSP), a central processing unit (CPU), a microcontroller, an application specific integrated circuit (ASIC), a field-programmable gate array (FPGA), a programmable logic device, a discrete gate or transistor logic component, a discrete hardware component, or any combination thereof). In some cases, the processing resources can be configured to operate a memory array using a memory controller. In other cases, a memory controller can be integrated into the processor. The processing resources can be configured to execute computer-readable instructions stored in a memory to perform various functions (e.g., function or tasks supporting overlaying exercise information on a remote display).

An I/O controller can manage input and output signals for the runaway mitigation system and/or the exercise machine. Input/output control components can also manage peripherals not integrated into these devices. In some cases, the input/output control component can represent a physical connection or port to an external peripheral. In some cases, I/O controller can utilize an operating system such as iOS®, ANDROID®, MS-DOS®, MS-WINDOWS®, OS/2®, UNIX®, LINUX®, or another known operating system.

Memory resources can include random access memory (RAM) and read only memory (ROM). The memory can store computer-readable, computer-executable software including instructions that, when executed, cause the processor to perform various functions described herein. In some cases, the memory resources can contain, among other things, a Basic Input-Output system (BIOS) which can control basic hardware and/or software operation such as the interaction with peripheral components or devices.

The incline determiner represents programmed instructions that, when executed, cause the processor to determine the incline of the treadmill deck. In some cases, the incline determiner requests the angle from a distance sensor, from a level sensor, from a gravity sensor, from an accelerometer, from another type of sensor, or combinations thereof. In response, the sensor can send raw data to the incline determiner where the raw data is interpreted to determine the incline angle. In other examples, the incline determiner receives data that is at least partially processed. In other examples, the incline mechanism of the treadmill is in communication with the incline determiner. The incline mechanism can know the incline angle at which it has set the deck and can continuously send, periodically send, or send on demand information about the angle to the incline determiner.

The belt speed determiner represents programmed instructions that, when executed, cause the processor to determine the speed that the tread belt is moving. In some cases, the speed determiner requests the angle from an odometer, optical sensor, an accelerometer, another type of sensor, or combinations thereof. In response, the sensor can send raw data to the incline determiner where the raw data is interpreted to determine the tread belt speed. In other examples, the belt speed determiner receives data that is at least partially processed.

The resistor thermometer represents programmed instructions that, when executed, cause the processor to determine a temperature of at least one component of the treadmill that is indicative of a runaway condition. In one example, the resistor thermometer can measure the temperature of a dump resistor that is in electrical communication with the motor. In those conditions where the motor is in a runaway condition, the motor can be generating electricity and the generated electricity can be directed to the dump resistor to convert this electricity into heat. Under those circumstances where the dump resistor's temperature is above a predetermined threshold, the processor can determine that a runaway condition exists.

The resistance determiner represents programmed instructions that, when executed, cause the processor to determine a resistance load on the motor. The resistance determiner can take inputs from the incline determiner, the belt speed determiner, the resistance thermometer, a user weight input, an inputted tread belt speed, an actual tread belt speed, other information, or combinations thereof.

In some cases, the resistance determiner measures the speed inputted into the console by the user to operate the tread belt (inputted speed). The inputted speed can be compared to the actual speed determined by the belt speed determiner or through another mechanism. If the actual speed and the inputted speed do not match, the resistance determiner can conclude that the resistance on the motor is too low to prevent a runaway condition or the processor can determine that a runaway condition exists.

In some examples, the resistance determiner can determine that an insufficient load exists on the motor to prevent a runaway condition when the temperature of the resistor is above a predetermined temperature threshold. In other examples, the resistance determiner can determine that an insufficient amount of resistance exists on the motor when the incline deck is orientated at an angle above a predetermined threshold angle.

While the above examples have been described with reference to specific mechanisms for determining that a runaway condition exists, any appropriate mechanism can be used to determine whether a runaway condition exists. In some examples, sensors incorporated into the treadmill are used to determine the existence of a runway condition. In other examples, sensors or information from a remote device can at least contribute to determining whether a runaway condition exists.

The treadmill can include a runaway mitigation mechanism. In some examples, the runaway mitigation mechanism is an active mechanism that operates in response to a determination that a runaway condition exists or is at least approaching a potential runaway condition. The active runaway mitigation mechanism can respond by increasing the load on the motor. In other examples, the runaway mitigation mechanism is a passive mechanism that automatically applies a greater resistance to the motor.

The active runaway mitigation mechanism can prevent a runaway condition from starting or can reduce, or even eliminate, the runaway condition. The active runaway condition mitigation mechanism can include a braking mechanism, a compressive breaking mechanism, a hydraulic mechanism, a pneumatic mechanism, another type of mechanism, or combinations thereof that apply mechanical resistance to a rotation of the motor's drive shaft.

In some cases, a drive shaft extends beyond a motor casing, and a rotary disc is rigidly attached to the drive shaft. In some of these examples, a compression brake can be positioned adjacent to the rotary disc. The compression brake can include a first pad adjacent a first side of the rotary disc, and a second pad adjacent a second side of the rotary disc. When activated, the first pad and the second pad move towards the rotary disc simultaneously and apply a compressive load to the rotary disc which resists rotational movement of the rotary disc. Under certain conditions, the compression brake can apply a compressive load that is sufficient to prevent the rotary disc, and therefore the drive shaft, from rotating at all. Under other conditions, the compression brake can apply a compressive load that merely increases the resistance to the rotational movement of the rotary disc, but is not sufficient to stop the drive shaft from rotating. When a runaway condition is sensed, the compression brake can be activated to increase the mechanical resistance to the motor to at least mitigate the runaway condition.

In another example, the rotary disc can include at least some magnetically conductive material. A magnetic unit can be positioned adjacent to a rim of the rotary disc. The magnetic unit can apply a magnetic force on the rotary disc that resists movement of the rotary disc and therefore movement of the drive shaft.

The magnetic unit can be positionable with a linear actuator. The linear actuator can include an actuator motor and a screw rod. In this example, as the motor operates in a first direction, the screw rod moves the magnetic unit in a direction towards the rotary disc. In the same example, as the motor operates in a second direction, the screw rod moves the magnetic unit in another direction away from the rotary disc. As the magnetic unit approaches the rotary disc, the magnetic load applied to the rotary disc can increase so that more resistance is applied to the rotary disc's movement and mechanical resistance on the motor increases. Similarly, as the magnetic unit moves away from the rotary disc, the magnetic load on the rotary disc can decrease, which lowers mechanical resistance on the motor. In alternative embodiments, the magnetic unit is an electromagnet that produces a magnetic field that is proportional to the power supplied to the magnetic unit. In this example, the magnetic strength applied to the rotary disc is adjustable by varying the power to the magnetic unit.

In those examples where the runaway mitigation mechanism is passive, the resistance can be applied automatically without a command instruction to the motor under those circumstances when a runaway condition is more likely to occur. For example, the increased resistance on the motor can be automatically applied when the treadmill deck is inclined above a predetermined threshold angle.

In one example of a passive runaway mitigation mechanism, the mechanism includes a container and a portion of the drive shaft is partially disposed within the container. The container includes a fluid, such as an oil-based fluid. In some cases, the container moves with the deck. So, when the deck is in a level orientation, the container is held at a corresponding orientation. On the other hand, when the deck is inclined at an angle, the container is held in a tilting orientation.

In the level orientation, the fluid resides under the drive shaft without making contact with the drive shaft. In the tilted orientation, the fluid can pool in the proximity of the drive shaft so that the fluid is in contact with the drive shaft. In the illustrated example, the drive shaft is immersed in the fluid so that an entire circumference of the drive shaft is in contact with the fluid. In some examples, the contact with the drive shaft resists rotation of the drive shaft. In some cases, the viscosity of the fluid resists the rotation of the shaft. In some cases, the shaft has a generally symmetric shape, and the surface friction of the cylindrical shape and the fluid increases the resistance to the rotation of the drive shaft.

In other examples, the drive shaft can include features that increase the amount of resistance applied from at least partially immersion into the fluid. One feature that can increase the resistance includes at least one vane is attached to the drive shaft. The vane can push against the fluid as the drive shaft rotates thereby increasing the resistance to the rotation of the drive shaft. While this example has been depicted with a vane for increasing the resistance to the drive shaft's rotation, any appropriate type of feature that can increase the resistance can be incorporated into the drive shaft.

In another example, a magnet can come into closer proximity with the drive shaft as the deck is inclined. In this example, the closer that the magnet is to the drive shaft, the greater influence the magnet's flux has on the drive shaft resulting in a greater resistance to the rotation of the drive shaft.

It should be noted that the methods described above describe possible implementations, and that the operations and the steps can be rearranged or otherwise modified and that other implementations are possible. Furthermore, aspects from two or more of the methods can be combined.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any conventional processor, controller, microcontroller, or state machine. A processor can also be implemented as a combination of computing devices (e.g., a combination of a digital signal processor (DSP) and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed so that portions of functions are implemented at different physical locations.

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. In some cases, the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. A portable medium, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein can be applied to other variations without departing from the scope of the disclosure. Thus, the disclosure is not limited to the examples described herein, but is to be accorded the broadest scope consistent with the principles and novel features disclosed herein.

What is claimed is:

1. A treadmill, comprising:
    a deck;
    a first pulley incorporated into the deck;
    a second pulley incorporated into the deck;
    a tread belt surrounding the first pulley and the second pulley;
    a drive motor in mechanical communication with at least one of the first pulley and the second pulley to move the tread belt in a first direction, the drive motor including a drive shaft extending beyond the drive motor; and
    a runaway mitigation system, including:
        a magnetic unit adjacent to the drive shaft, wherein the magnetic unit moves closer to the drive shaft as the deck is inclined.

2. The treadmill of claim 1, wherein the magnetic unit applies a magnetic resistance to a rotation of the drive shaft.

3. The treadmill of claim 2, wherein when the drive shaft comes into closer proximity to the magnetic unit, the magnetic unit applies a greater magnetic resistance to the rotation of the drive shaft.

4. The treadmill of claim 1, wherein a rotary disc is rigidly attached to the drive shaft, and wherein the rotary disc includes at least some magnetically conductive material such that the magnetic unit applies a magnetic force on the rotary disc.

5. The treadmill of claim 1, wherein the runaway mitigation system includes a linear actuator connected to the magnetic unit, the linear actuator positioning the magnetic unit relative to the drive shaft.

6. A method for mitigating a treadmill runaway, comprising:
changing an incline angle of a deck to a threshold angle, wherein changing the incline angle includes moving a drive shaft of a motor that drives a movement of a tread belt relative to a resistive element; and
when the incline angle is at or above the threshold angle, applying a resistive force to a rotation of the drive shaft with the resistive element.

7. The method of claim 6, wherein applying the resistive force to the rotation of the drive shaft includes applying a magnetic resistive force to the drive shaft.

8. The method of claim 7, wherein applying the magnetic resistive force to the drive shaft includes applying a greater magnetic resistive force to the drive shaft as the resistive element moves closer to the drive shaft.

9. The method of claim 7, wherein applying the magnetic resistive force to the drive shaft includes applying the magnetic resistive force to a rotary disc rigidly attached to the drive shaft, the rotary disc including at least some magnetically conductive material.

10. The method of claim 6, further comprising determining that a runaway condition exists, and wherein applying the resistive force includes applying the resistive force to the rotation of the drive shaft when the incline angle is at or above the threshold angle and the runaway condition exists.

11. The method of claim 10, wherein determining that the runaway condition exists includes adjust the threshold angle based on a belt speed.

12. The method of claim 10, wherein determining that the runaway condition exists includes adjust the threshold angle based on a weight of a user.

13. A method for mitigating a treadmill runaway, comprising:
changing an incline of a deck from a first orientation to a second orientation;
moving a container with the deck, a portion of a drive shaft of a motor being inserted in the container, wherein the motor drives a movement of a tread belt; and
contacting a fluid with the drive shaft when the container is in the second orientation.

14. The method of claim 13, wherein the contacting the drive shaft with the fluid includes resisting rotation of the drive shaft.

15. The method of claim 13, wherein in the first orientation, the drive shaft does not contact the fluid.

16. The method of claim 13, further comprising immersing the drive shaft in the fluid so that an entire circumference of the drive shaft is in contact with the fluid.

17. The method of claim 13, wherein moving the container with the deck moving the container from the first orientation to the second orientation.

18. The method of claim 17, wherein moving the container from the first orientation to the second orientation includes pooling fluid in a proximity of the drive shaft.

19. The method of claim 17, wherein moving the container from the first orientation to the second orientation includes flowing fluid from a trough to a proximity of the drive shaft.

20. The method of claim 13, further comprising pushing against the fluid with a vane on the drive shaft.

* * * * *